United States Patent [19]
Fergason

[11] Patent Number: 5,532,854
[45] Date of Patent: Jul. 2, 1996

[54] FOLDED VARIABLE BIREFRINGERENCE ZEROTH ORDER HYBRID ALIGNED LIQUID CRYSTAL APPARATUS

[76] Inventor: James L. Fergason, 92 Adam Way, Atherton, Calif. 94025

[21] Appl. No.: 187,050

[22] Filed: Jan. 25, 1994

[51] Int. Cl.$^6$ .......................... G02F 1/133; G02F 1/1337
[52] U.S. Cl. ............................. 359/93; 359/102; 359/84
[58] Field of Search ................................. 359/70, 75, 77, 359/93, 102, 84

[56] References Cited

U.S. PATENT DOCUMENTS

| Re. 32,521 | 10/1987 | Fergason | 359/36 |
|---|---|---|---|
| 2,885,551 | 5/1959 | Greanjas . | |
| 3,854,793 | 12/1974 | Kahn . | |
| 4,090,219 | 5/1978 | Ernstoff et al. | 359/48 |
| 4,097,128 | 6/1978 | Matsumoto et al. | 359/52 |
| 4,114,990 | 9/1978 | Mash et al. | 355/93 |
| 4,114,998 | 9/1978 | Mash et al. | 355/200 |
| 4,385,806 | 5/1983 | Fergason | 359/39 |
| 4,436,376 | 3/1984 | Fergason | 359/40 |
| 4,468,703 | 8/1984 | Fujiwara | 358/464 |
| 4,540,243 | 9/1985 | Fergason | 359/63 |
| 4,582,395 | 4/1986 | Morozumi | 359/59 |
| 4,582,396 | 4/1986 | Johnson | 359/73 |
| 4,611,889 | 9/1986 | Buzak | 359/48 |
| 4,648,691 | 3/1987 | Oguchi et al. | 359/54 |
| 4,834,500 | 5/1989 | Berkshire et al. | 359/43 |
| 4,923,286 | 5/1990 | Grupp | 359/75 |
| 4,958,915 | 9/1990 | Okada | 345/97 |
| 4,997,263 | 5/1991 | Cohen | 359/49 |
| 5,093,652 | 3/1992 | Bull | 345/88 |
| 5,128,702 | 7/1992 | Wood | 354/106 |
| 5,128,782 | 7/1992 | Wood | 357/48 |
| 5,144,292 | 9/1992 | Shiraishi | 345/102 |
| 5,221,982 | 6/1993 | Faris | 359/93 |
| 5,295,009 | 3/1994 | Barnik et al. | 359/65 |
| 5,313,225 | 5/1994 | Miyadera | 345/102 |
| 5,319,478 | 6/1994 | Funfschilling | 359/65 |
| 5,325,218 | 6/1994 | Willett et al. | 359/53 |

FOREIGN PATENT DOCUMENTS

| 579534 | 11/1988 | Australia . | |
|---|---|---|---|
| 2572210 | 4/1986 | France | 359/77 |
| 5229753 | 3/1977 | Japan | 359/77 |
| 5573023 | 6/1980 | Japan . | |
| 56-114931 | 9/1981 | Japan . | |
| 58-142315 | 8/1983 | Japan . | |
| 62-47623 | 3/1987 | Japan . | |
| 62-231221 | 10/1987 | Japan . | |
| 6313018 | 1/1988 | Japan . | |
| 3249730 | 11/1991 | Japan . | |
| 3288885 | 12/1991 | Japan . | |
| 2033602 | 5/1980 | United Kingdom . | |

OTHER PUBLICATIONS

Matsumoto et al, "Field–induced deformation of hybrid–aligned nematic liquid crystals: New Multicolor Liquid Crystal Display", Journal of Applied Physics, vol. 47 #9 Sep. 1976 pp. 3842–3845.

Primary Examiner—William L. Sikes
Assistant Examiner—Kenneth Parker
Attorney, Agent, or Firm—Renner, Otto, Boisselle, & Sklar

[57] ABSTRACT

A reflective variable birefringence liquid crystal cell has an active matrix substrate, a birefringent material, a pair of surfaces containing the birefringent material therebetween, the birefringent material in proximity to the active matrix substrate having homeotropic alignment to eliminate the affect of varying cell thickness due to peaks and valleys in the surface of the active matrix substrate, the birefringent material in proximity to the other surface being switchable to provide relatively minimal optical phase retardation and increased optical phase retardation, the liquid crystal material may be preconditioned to assume a particular alignment to provide for a prescribed amount of retardation in one operational state of the cell.

53 Claims, 4 Drawing Sheets

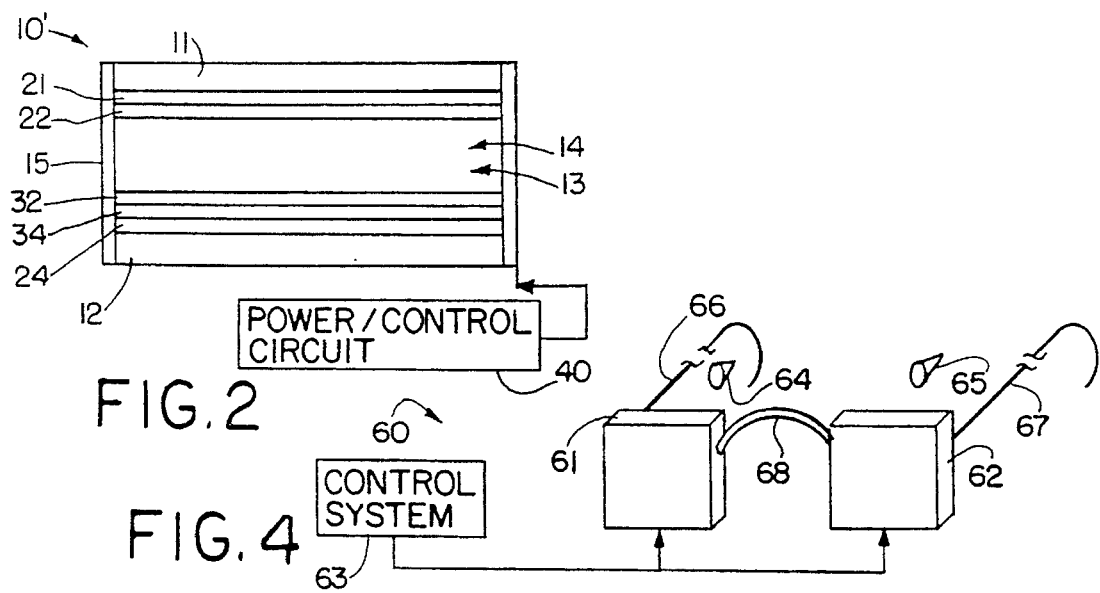
FIG. 2
FIG. 4
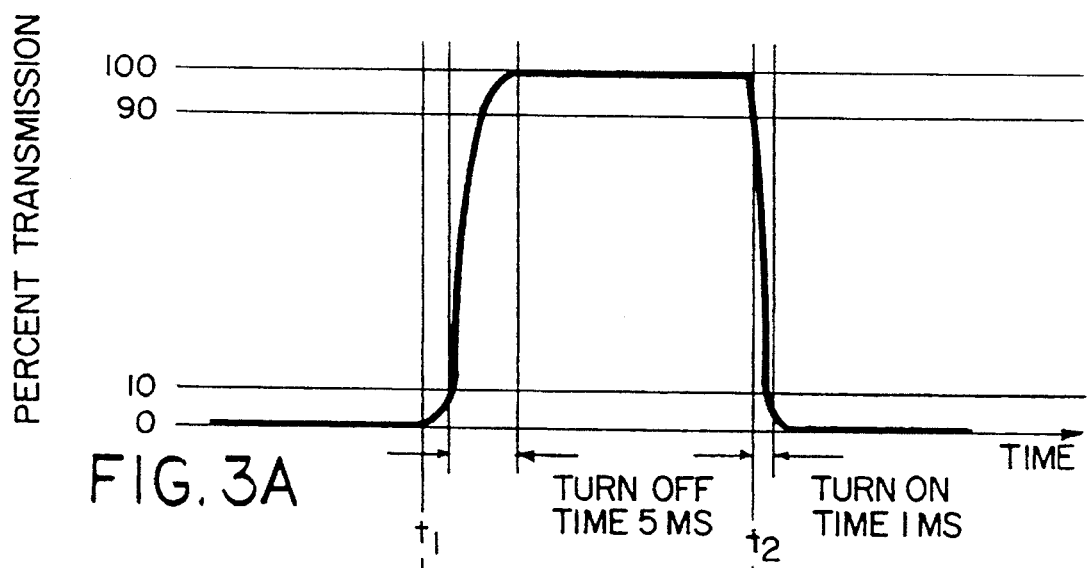
FIG. 3A
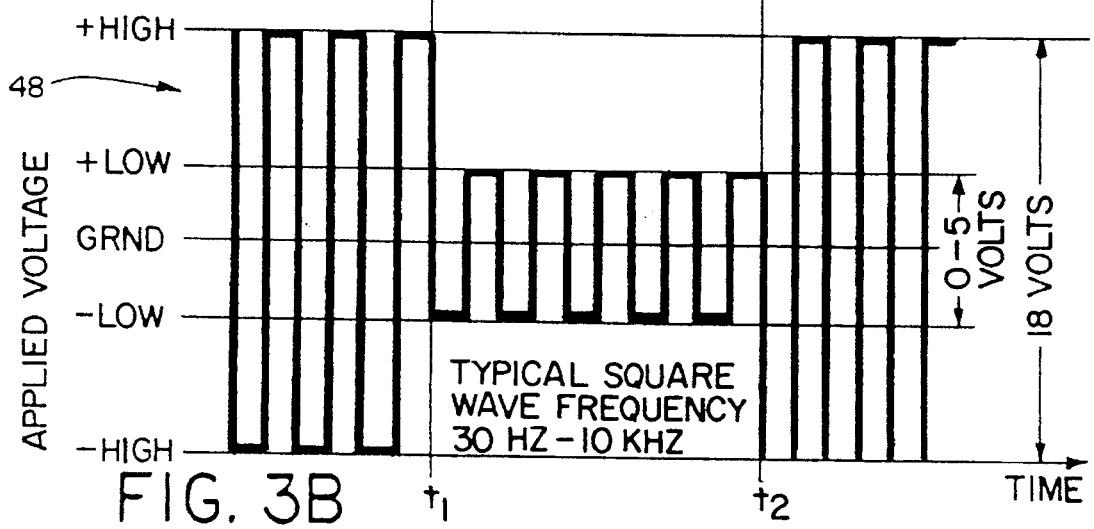
FIG. 3B

FOLDED VARIABLE BIREFRINGERENCE ZEROTH ORDER HYBRID ALIGNED LIQUID CRYSTAL APPARATUS

TECHNICAL FIELD

The present invention relates generally, as is indicated, to a folded variable birefringence liquid crystal apparatus, and, more particularly, to a liquid crystal display using such apparatus.

BACKGROUND

Various types of liquid crystal cells and displays which use liquid crystal cells are known. Examples of liquid crystal cells are those known as twisted nematic, super twist, and variable birefringence. In a typical liquid crystal cell, liquid crystal material is contained between a pair of substrates, and a seal is provided about the edge of the liquid crystal cell between the substrates to prevent leakage of the liquid crystal material. Exemplary substrates are glass. Usually some type of surface treatment is provided the surface of one or both substrates confronting or bounding the liquid crystal material for the purpose of providing a preferred alignment of the liquid crystal material, and especially to obtain such alignment in the absence of the energization of the liquid crystal cell. An example of such energization is that provided by an electric field derived by applying a voltage across a pair of electrodes located on the respective confronting substrates.

Liquid crystal alignment usually refers to the alignment of the liquid crystal structure, especially when referring to nematic liquid crystal material. Alignment also may refer to the direction of the liquid crystal director, structural organization of the liquid crystal material, etc., as is well known in the art. Several of the types of liquid crystal material include nematic liquid crystal, smectic liquid crystal and cholesteric liquid crystal. Nematic liquid crystal tends to align directionally with respect to a surface of a liquid crystal cell with which the liquid crystal is in relative proximity (meaning next to or near) or is directly engaged, etc.

The surface treatment referred to above tends to cause that liquid crystal material which is generally in proximity to the particular substrate to align in a preferred direction. Examples of surface treatment include rubbing the surface with cotton, felt, or some other material in a particular direction, which causes the liquid crystal material to align relative to that direction. Another example of surface treatment includes applying a silicon oxide (SiO) coating to the surface using an evaporation technique; depending on the angle of evaporation relative to the substrate surface and other factors, which are known in the art, the liquid crystal material will tend to align in a particular direction, which usually is generally parallel to the surface but at some tilt angle, as is well known. Other examples of surface treatment includes the applying of a polyvinyl alcohol (PVA) material to the surface or a polyimide coating to the surface. The various coatings also may be rubbed using cotton, felt or some other material to provide the desired alignment characteristics.

In a twisted nematic liquid crystal cell the rub direction or primary alignment direction (not considering the tilt angle) at one substrate is at an angle other than 0 degrees or 180 degrees relative to the rub direction or primary alignment direction of the other substrate. For example, the rub or alignment directions of respective substrates may be at 90 degrees to each other in the standard twisted nematic liquid crystal cell so as to provide for a helical twist of 90 degrees in the liquid crystal alignment direction from one substrate surface to the other. In an example of a variable birefringence liquid crystal cell, the rub direction or primary alignment direction of one substrate usually is oriented in parallel with the rub direction or primary alignment direction of the other substrate. The mentioned parallel alignment may be at 0 degrees or at 180 degrees, and there may be the same or different tilt angles at or near respective substrate surfaces of the cell. Other relative alignment directions may be used in respective liquid crystal cells, as is known.

Most current displays in head mounted display systems utilize the twisted nematic mode of operation of the liquid crystal cell(s) used in such displays. The speed of this type of display is relatively slow causing the image to tend to smear when rapidly changing video is displayed. The speed of response (switching speed from one light transmissive condition to the other, for example) is too slow to allow color images to be created by color sequential addressing also referred to as field sequential or frame sequential operation. It would be desirable to provide increased switching speed of operation in a liquid crystal display device. The switching speed of at least some variable birefringence liquid crystal cells has been found to be faster than that of twisted nematic liquid crystal cells. (See, for example, U.S. Pat. Nos. 4,385,806, 4,436,376, 4,540,243, Re. 32,521, and 4,582,396.)

An example of field sequential or frame sequential operation, sometimes also referred to as color sequential addressing, is described in U.S. Pat. No. 4,582,396. A liquid crystal display sequentially presents respective images at a speed faster than the human eye can separately distinguish or follow. The sequential images are separated in time rather than in space. The images are merged or integrated by the eye to compose an image which in effect is a combination of several sequential images. In this way images having multiple colors can be produced. For example, in the mentioned patent using a series of color filters that are responsive to the direction of plane polarized light a multicolor image can be produced; at one moment in time an image is produced and is filtered by one color filter; and at a subsequent moment in time the same or a correlated image is produced and is filtered by a second color filter; the images are combined (integrated) by the viewer's eye so that a combined image is seen.

In the absence of a prescribed input, such as an electric field, to the liquid crystal cell, the alignment of liquid crystal material usually is influenced by the surface and surface treatment, especially for nematic liquid crystal or operationally nematic liquid crystal. Operationally nematic means the liquid crystal operates sufficiently similarly to nematic liquid crystal as to be useful in the present invention described below. However, upon application of an electric field, at least some of the liquid crystal material tends to align with respect to the field, which tends to overcome the influence of the surfaces on liquid crystal alignment. The stronger the electric field, i.e., the greater the magnitude of the field or the voltage causing the field, the greater the amount of the liquid crystal material that tends to align with respect to the field and/or the more accurately the liquid crystal aligns with the field. The electric field may be developed by applying a voltage between an electrode located on one of the substrates and an electrode on the other of the substrates. In some liquid crystal cells known as active matrix or thin film transistor (TFT) devices, a number of electronic components, such as transistors, capacitors, etc., may be provided at or on one of the substrates or surfaces thereof to develop the appropriate electrical energization for liquid crystal material in the liquid crystal cell at one or more locations in the cell.

In an exemplary flat panel display technology an active matrix liquid crystal display is fabricated from substrates of amorphous or polysilicon thin film transistor arrays deposited on quartz or glass. Displays of this type are typically back lit and viewed in transmission. They suffer from several disadvantages. First, to obtain a colored image filters are deposited at each pixel (sometimes referred to in the art as a picture element where a portion of an image is created; the sum of all or many of the pixels of the display can be used to create a total image, as is well known). The fabrication of such filters is a difficult and expensive process and results in a display with a dramatically reduced light transmission as well as ⅓ reduction in image resolution since three filters (e.g., red, green and blue) are required at separate areas of each pixel. Second, the thin film transistors of such arrays must be physically large causing a large fraction of each pixel to be non-functional optically, which reduces the amount of light output capability for each pixel. Also, since the traces of such arrays are opaque and black in transmission, the inter pixel spaces are emphasized.

An alternate approach addressing the above deficiencies of the substrates described above has been to fabricate a single crystal silicon array on a wafer. This allows the use of conventional semiconductor processing, and the transistors can be physically smaller than those mentioned above. However, the array must be "lifted" from the wafer and deposited onto the glass substrate. The process to do this introduces additional steps to the wafer fabrication process and adds to the cost of the substrate.

As is described further below, the present invention relates to liquid crystal cells and displays which are fabricated directly on the semiconductor wafer substrate.

A disadvantage of an active matrix substrate used in a liquid crystal cell is the non-uniformity of the surface thereof, which usually has various peaks and valleys in the surface due to the electronic components formed therein. Such surface non-uniformity may have a noticeable degrading effect on the quality of images produced by a liquid crystal cell. For example, a change in path length of light in such a liquid crystal cell or a random alignment or misalignment of liquid crystal material due to a peak or a valley in a substrate may uncontrollably change optical phase retardation. This negative impact on the display is compounded if the display is used in a reflective mode because light then transmits through the liquid crystal twice.

To increase the contrast, resolution, and brightness of images created by a liquid crystal cell in a display and to facilitate manufacturing, it would be desirable to use an active matrix drive device for the liquid crystal cell. In the present invention these advantages can be accomplished, for example, by using a display operated in reflective mode. The active matrix transistors then can be located in the substrate beneath the electrodes of the matrix array, if desired, which increases the optical operational area of each pixel. In contrast, in a transmission display the respective active matrix transistors block light in part of each pixel. However, the fact that the surface of an active matrix substrate is rough or unsmooth, which disrupts a uniform liquid crystal alignment, has lead away from using such a substrate, especially in a variable birefringence liquid crystal cell.

Homogeneous alignment usually refers to an alignment of liquid crystal material in a direction that is generally parallel to the plane of a surface of a substrate of a liquid crystal cell. The liquid crystal material may have a tilt angle relative to the surface. Various tilt angles are possible and are used in various types of liquid crystal devices, as is well known. Exemplary liquid crystal cells which use homogeneous alignment are twisted nematic liquid crystal cells, used, for example, in watch and computer displays. Homeotropic alignment of liquid crystal material usually refers to an alignment that is generally perpendicular (sometimes referred to as normal) to the surface or the plane of the surface of the substrate of the liquid crystal cell. In the past homeotropic alignment was used in liquid crystal cells that work in a dynamic scattering mode in response to application of an electric current.

Nematic liquid crystal and smectic liquid crystal can have characteristics of birefringence, whereby the ordinary index of refraction and the extraordinary index of refraction are different. In a variable birefringence liquid crystal cell, by changing the orientation or alignment of the liquid crystal (or some of the liquid crystal) relative to the direction of light propagating through the liquid crystal, optical phase retardation can be varied correspondingly. Examples of variable birefringence liquid crystal cells in which optical phase retardation can be varied are described in U.S. Pat. Nos. 4,385,806, 4,436,376, 4,540,243, Re. 32,521, and 4,582,396, which are incorporated by reference. As is described in those patents, by changing the applied input, such as electric field, the alignment of liquid crystal material in the liquid crystal cells can be altered thereby to alter the effective optical phase retardation of the light transmitted through the liquid crystal material. As also is described in the just-mentioned patents, the liquid crystal material in proximity to the respective substrates has generally homogeneous alignment; these portions of the liquid crystal material or liquid crystal layer sometimes are referred to as the surface layers of the liquid crystal material and it is these layers or at least parts thereof which switch alignment in response to applied field input during operation of the liquid crystal cell to change the optical phase characteristics of the liquid crystal cell in response to say application or removal of electric field. The surface layers or surface portions are separated by a portion of the liquid crystal material or a layer thereof which generally is aligned perpendicularly with respect to the surfaces. Such perpendicularly aligned liquid crystal material tends not to contribute to optical phase retardation (or whatever contribution it has is relatively minimal compared to the possible phase retardation provided by the surface portions). Such generally perpendicularly aligned liquid crystal material also may tend to separate the physical/mechanical interaction of the two surface portions of liquid crystal material during operation of the liquid crystal cell as the surface portions switch from one alignment to the other. The liquid crystal material which tends to separate the surface portions sometimes is referred to as the "bulk" liquid crystal; whether the bulk is more or less quantity of liquid crystal than the surface portions does not deter use of such label "bulk". Various means may be used to align the bulk portion of the liquid crystal material. Those means may be electrical, mechanical, a combination thereof, or some other means, for example, as is described in the aforementioned patents.

It would be desirable to provide variable optical phase retardation capability in a reflective liquid crystal cell and display using such a cell, and, especially, to do so in a liquid crystal cell that has an active matrix type substrate. It would be desirable to provide substantial uniformity of operation and optical phase retardation characteristics in a variable birefringence liquid crystal cell while reducing the affect of and/or without regard to disparities in cell thickness due to peaks and valleys in the substrate.

SUMMARY

According to an aspect of the invention, a liquid crystal cell includes a birefringent liquid crystal material, a pair of surfaces containing the birefringent liquid crystal material therebetween, the birefringent liquid crystal material in proximity to one surface providing relatively minimal optical phase retardation, the birefringent liquid crystal material being preconditioned to switch between and/or in a range of retardations to provide relatively minimal optical phase retardation and increased optical phase retardation.

According to another aspect, a birefringent liquid crystal apparatus includes a pair of surfaces; liquid crystal material between the surfaces, the liquid crystal material in relative proximity to one surface exhibiting generally homeotropic alignment, one of the surfaces being reflective, the liquid crystal material in relative proximity to the other surface exhibiting generally homogeneous alignment, and means to alter alignment of at least one of the alignments to change the optical phase retardation characteristic exhibited by the liquid crystal material in the apparatus.

According to a further aspect, a reflective liquid crystal apparatus includes an optically reflective semiconductor substrate having electrical components, a further substrate, liquid crystal between the substrates, electrical means cooperative with electrical components of the semiconductor substrate to apply electric field to liquid crystal material to alter the optical phase retardation characteristics of the liquid crystal, the further substrate being able to transmit light therethrough for transmission through the liquid crystal and reflection by the optically reflective semiconductor substrate.

According to an additional aspect, a liquid crystal apparatus includes first and second substrates, one substrate having a relatively unsmooth surface and the other having a relatively smooth surface, birefringent material between the substrates, the birefringent material comprising liquid crystal material, the liquid crystal material in relative proximity to the relatively unsmooth substrate having generally homeotropic alignment, and the liquid crystal material in relative proximity to the relatively smooth surface having generally homogenous alignment.

According to even another aspect, a display apparatus includes a source of polarized light, a liquid crystal display for selectively modulating light, the liquid crystal display comprising a semiconductor substrate and a further substrate with birefringent liquid crystal material between the substrates, the source being operative to provide light to pass into the liquid crystal material through the further substrate toward the semiconductor substrate, and means to reflect light to pass through the liquid crystal material and subsequently through the further substrate, the liquid crystal material being operative in response to an input to change the optical phase retardation characteristics of the liquid crystal material.

According to even another aspect, a birefringent liquid crystal optical apparatus includes a pair of substrates and a birefringent liquid crystal material between the substrates, means for applying electric field between the substrates to alter liquid crystal orientation (sometimes referred to as alignment) and therefore optical phase retardation characteristics of liquid crystal subject to such field, one of the substrates including means for causing generally homeotropic alignment of liquid crystal material that is relatively proximate to the substrate, the means for applying electric field comprising mean to buttress such homeotropic alignment.

Another aspect relates to a liquid crystal cell fabricated directly on a semiconductor substrate.

Another aspect relates to a method for fabricating a liquid crystal cell directly on a semiconductor substrate.

Another aspect relates to a reflective liquid crystal display in which one of the substrates is a semiconductor substrate.

Another aspect relates to a reflective variable birefringence liquid crystal cell in which one of the substrates is a semiconductor substrate Another aspect relates to providing fast switching operation of a variable birefringence liquid crystal cell for use in an optical device.

Another aspect relates to providing fast switching operation of a variable birefringence liquid crystal cell for use in a head mounted display system.

Another aspect relates to a variable birefringence liquid crystal cell having sufficiently fast optical switching speed as to provide field sequential switching developing multicolor or full color display function.

Another aspect relates to a fast acting variable birefringence liquid crystal cell for providing high resolution images.

Another aspect relates to a variable birefringence liquid crystal cell useful in a head mounted display.

Another aspect relates to a variable birefringence liquid crystal cell useful in a projection display.

Another aspect relates to displays using the herein disclosed variable birefringence liquid crystal cells.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. It will be appreciated that features of one or more embodiments hereof may be used with one or more other embodiments hereof.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the next drawings:

FIG. 2. is a schematic side elevation view of a reflective variable birefringence liquid crystal cell similar to that of FIG. 1;

FIGS. 3A and 3B are, respectively, graphs depicting light transmission characteristics and applied electrical signal for achieving such transmission characteristics for the liquid crystal cell of FIG. 1;

FIG. 4 is a schematic illustration of a head mounted display using a plurality of display systems;

DESCRIPTION

Figure 1:
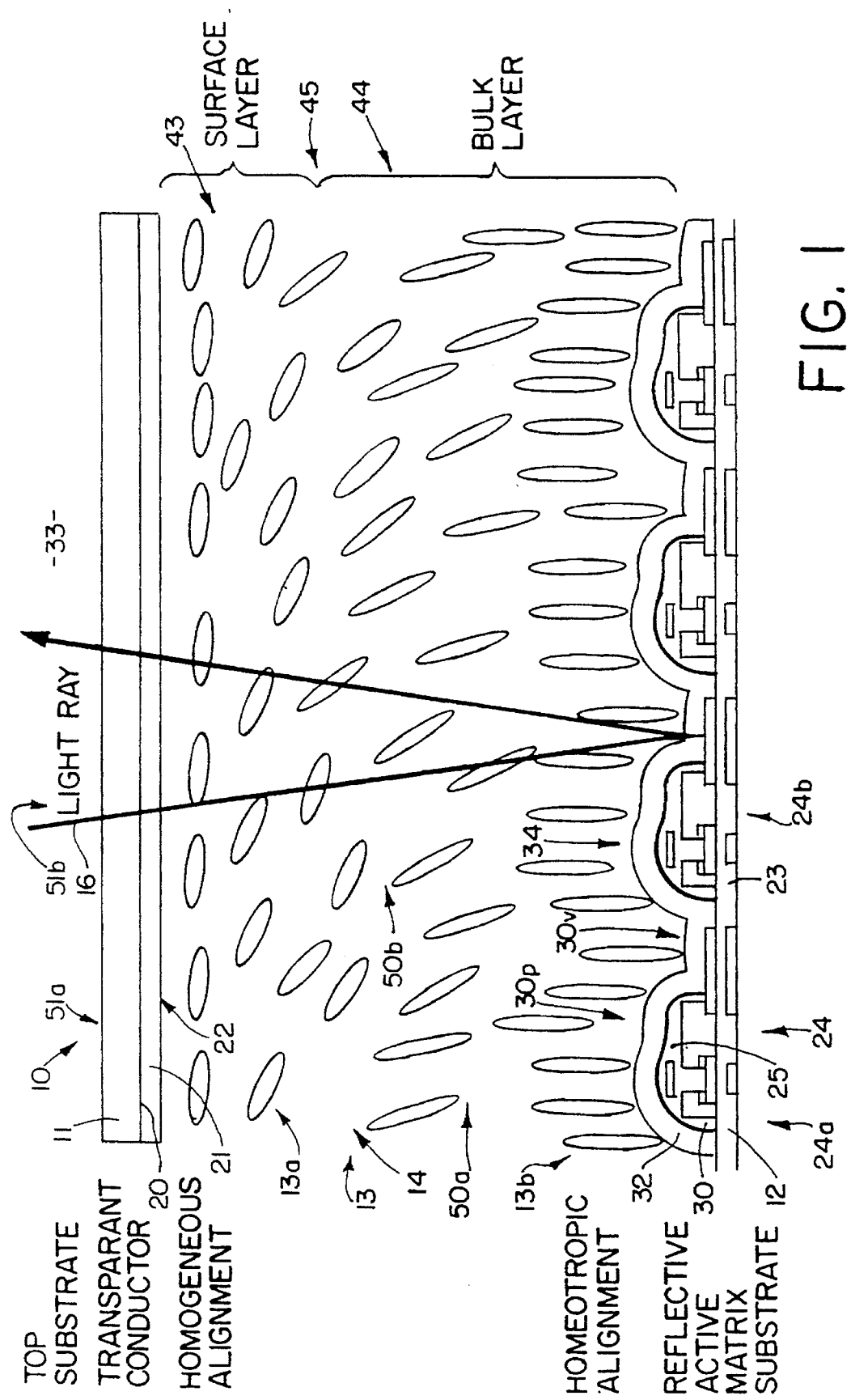
FIG. 1 is a schematic side elevation view of a reflective variable birefringence liquid crystal cell having an active matrix substrate, the cell being aligned ready for operation.

Referring to the drawings, wherein like references numerals designate like parts in the several figures, and initially to FIG. 1, a reflective variable birefringence liquid crystal cell having an active matrix substrate in accordance with the present invention is indicated at 10. The liquid crystal cell 10 includes a pair of substrates 11, 12 and liquid crystal material 13 in the space 14 between the substrates. A seal 15 (FIG. 2) is provided about the perimeter of the liquid crystal cell to retain the liquid crystal material therein preventing leakage.

Of the liquid crystal material 13, the liquid crystal material 13a relatively proximate (meaning relatively near or at) the substrate 11 generally has homogeneous alignment. The liquid crystal material 13b relatively proximate the substrate 12 has generally homeotropic alignment. During operation of the liquid crystal cell 10 optical phase retardation of light 16 (represented by a light ray line shown) traveling through the liquid crystal material can be controlled as a function of the applied electric field across the liquid crystal material, as is described in greater detail below.

The substrate 11 may be glass, plastic, or some other material, as may be desired. The surface 20 of the substrate 11 facing the liquid crystal material 13 is relatively smooth or flat. A transparent conductor 21 is on and/or supported by the surface 20 of the substrate 11. The conductor may be indium tin oxide or some other material that has electrically conductive characteristics suitable for use in the energization of the liquid crystal cell, for example application of electric field. The conductor 21 may be applied by a variety of conventional techniques. Surface treatment 22 is provided the substrate 11 to obtain the desired homogeneous alignment of liquid crystal material 13a. The surface treatment may be a polyimide coating (applied, for example, by evaporation or some other technique), which may or may not be rubbed, a coating of polyvinyl alcohol, which preferably is rubbed, or a direct rubbing of the exposed surface of the conductor 21. Rubbing may be done in conventional manner using cotton, felt or other material, as is well known. Other types of surface treatment also may be used to obtain the desired alignment.

The liquid crystal material 13 preferably is nematic liquid crystal material. A characteristic of nematic liquid crystal is that it tends to have directional orientation and not positional orientation, this being in contrast to smectic liquid crystal material which tends to have both directional and positional orientation. Another characteristic of nematic liquid crystal is that it tends to align with respect to a surface that is engaging or bounding the liquid crystal material, and the nature of such alignment may be governed by surface treatment. The alignment referred to herein is sometimes referred to as structural alignment, direction of liquid crystal axis or optical axis, direction of the liquid crystal directors, liquid crystal orientation, etc. Nematic liquid crystal also may be birefringent; desirably the nematic liquid crystal material 13 is birefringent to cause the desired optical phase retardation as a function of liquid crystal alignment or liquid crystal cell energization. An example of nematic liquid crystal material 13 is that sold under the designations E7, E22 and E54 (each sold by E. Merck).

The liquid crystal cell 10 will function with many other different nematic liquid crystal materials. In the embodiment of liquid crystal cell 10 the liquid crystal material should have positive dielectric anisotropy and be birefringent. The actual nematic liquid crystal material used may be selected as a function of speed of response desired by the liquid crystal cell 10; that speed may be a function of the elastic constants of the liquid crystal material and of the thickness of the liquid crystal cell, i.e., of the liquid crystal material layer in the cell. Cell thickness and the birefringence of the liquid crystal material collectively would be characteristics that affect the total amount of optical phase retardation that is possible by the cell. For example, for a liquid crystal cell that is to be about 6 microns thick and to provide approximately ¼ lambda optical phase retardation on each pass of light 16 through the cell 10 a liquid crystal material, such as 1840 sold by E. Merck, which has a birefringence of from about 0.10 to about 0.12 would be useful. If such liquid crystal cell were to have a thickness of about 3 microns the birefringence of the liquid crystal material may be on the order of about 0.22, which is that for the liquid crystal material commonly designated E54. Liquid crystal material E7 is more suited to a liquid crystal cell which has a thickness or spacing of about 3 to 4 microns. Other liquid crystal materials suitable for these devices are identified in the catalog book "Merck Liquid Crystals, Merck Liquid Crystal Mixtures For Electro-Optic Displays" published by E. Merck September, 1992, which is hereby fully incorporated by reference.

In selecting a liquid crystal material for use in the cell 10 consideration also can be given to the field of view expected of the display using such cell. Usually the greater the birefringence of the liquid crystal material the narrower the angle of or field of view of the display over which an image of acceptable quality would be produced. Therefore, it is desirable that the birefringence be as low as possible consistent with the desired speed of response and thickness of the cell. Usually, the higher the birefringence of the liquid crystal material or the thinner the liquid crystal cell, the faster the switching speed of the cell.

In an example of the invention the liquid crystal cell 10 is able to provide a maximum of more than ¼ lambda retardation. During operation of the cell 10 it would be able to be switched between approximately or precisely zero retardation and ¼ lambda retardation. Preferably, as a function of the magnitude of electric field applied across the liquid crystal material 13 in the cell 10 the cell would be able to provide any amount of retardation between zero and ¼ lambda. The precise amount of retardation may vary slightly as a function of the wavelength of the light, as is known on account of the phenomenon of color dispersion; however, preferably the cell 10 is operated approximately at sufficiently low order, most preferably in the zero order range, so that the effects of color dispersion will be minimal if they exist at all.

The actual amount of retardation provided by the cell 10 operated in the reflective mode will be twice that provided by the liquid crystal layer 13 since the light passes through the cell twice. Therefore, a liquid crystal cell 10 which provides ¼ lambda retardation on the passage of light from one substrate to the other will provide that amount of retardation again as the light is reflected back to the first substrate. Accordingly, a cell 10 operated between 0 and ¼ lambda retardation will actually provide between 0 and ½ lambda retardation.

The substrate 12 is an active matrix semiconductor substrate. More particularly, the substrate 12 is a silicon substrate 23 having therein a plurality of electrical and/or electronic components 24 (the terms electrical and electronic regarding the substrate 23 may be used interchangeably below) formed by various solid state techniques that are known in the art. The substrate may be a single crystal silicon material.

Most TFT display devices use amorphous silicon or polysilicon. Either may be used in the case of the present invention. However, single crystal silicon is preferred because of the relatively uncomplicated standard processing techniques available to make devices from such material, exemplary devices being conventional RAM, DRAM and other semiconductor devices. Therefore, single crystal silicon substrates are readily available and reasonably inexpensive. Also, virtually any circuit configuration can be incorporated into the silicon semiconductor substrate material; and such circuits can work with a wide range of voltages. Although single crystal silicon usually is not transparent, it is useful in the present invention in which the liquid crystal cell 10 is operated in the reflective mode. If desired, other materials can be used for the substrate 12, such as gallium arsenide, germanium and/or other materials used in the semiconductor field.

On and/or in the silicon substrate 23 are a plurality of such components 24, such as transistors, electrodes, capacitors, diodes, and/or other components. A representative electrode is indicated at 25. The electronic components 24 are functional in response to an applied input to provide a voltage on or to electrodes 25 so that there is potential difference between the electrode 25 and the electrode 21 on the substrate 11. Such voltage and potential difference create an electric field between the electrodes 21, 25. Such electric field causes liquid crystal material to align relative to that field. By increasing or decreasing the magnitude of the field, more or less of the liquid crystal material located between the respective electrode 25 and the electrode 21, for the most part in a direct path there between, will align or not relative to the field. An exemplary active matrix substrate is manufactured and sold by a number of companies including Teleview Research, Inc., Palo Alto, Calif.

The liquid crystal material may be operationally nematic. Operationally nematic liquid crystal may or may not be nematic liquid crystal material; however, the operational properties of such material, e.g., being responsive to surface interaction to undergo alignment, having desired birefringence or other optical characteristics, being responsive to application of a prescribed input such as a field input, for example, an electric field, should be sufficiently similar to nematic liquid crystal to function in the cell 10 generally as is described herein.

The liquid crystal material may be smectic liquid crystal. Smectic liquid crystal tends to have memory or to hold alignment after having been aligned by a particular input, such as the application of a field. However, such alignment can be altered, for example, by application of heat to cause the smectic liquid crystal be become as nematic liquid crystal such that alignment would be a function of surface interaction. Therefore, under appropriate circumstances it is possible that the liquid crystal may be of the smectic liquid crystal type.

Preferably the liquid crystal is birefringent, as was mentioned above. The ordinary index of refraction and the extraordinary index of refraction of birefringent liquid crystal material are different. Therefore, as a result of alignment of the liquid crystal material, one component of plane polarized light, for example, may be retarded relative to the other component; and in this way the state of polarization can be altered. For example, the plane of polarization can be rotated or the light can be changed from right circular polarized to left circular polarized light (or vice versa).

There are a number of electronic components 24 on and/or in the substrate 12, as is seen in FIG. 1, and those components tend to cause the surface 30 of the substrate to be relatively rough or unsmooth having a multitude of peaks 30p and valleys 30v. Surface treatment 32 is provided the surface 30 of the substrate 12. The surface treatment 32 is intended to tend to cause homeotropic alignment of liquid crystal material that is located relatively proximate the surface 30 of the substrate 12.

Various techniques are available for providing the surface treatment 32 to obtain generally homeotropic alignment. For example, the surface 30 may be coated with a Langmuir film using known processing techniques. The Langmuir film is a surfactant, which forms a monomolecular film. Another surface treatment may be provided by applying barium stearate to the surface 30. A further example is to use a steryl silicone material on the surface 30. Still another coating material for the surface 30 is silane. A silane material, for example, provides fatty acid molecules standing on their ends or tails, which tend to cause the nematic liquid crystal structure to align homeotropically. The foregoing are examples of techniques conventionally used to obtain homeotropic alignment of nematic liquid crystal material. Other techniques also may be used to achieve the structure and functions of the invention describe herein.

Absent a specific surface treatment to obtain homeotropic alignment of the liquid crystal material in relative proximity to the surface 30, the liquid crystal structure at the surface 30 would tend to follow the contour of the surface somewhat in parallel thereto. Due to the roughness, unevenness, waviness, etc. of the surface 30, a relatively random orientation of the liquid crystal structure there would tend to occur, which would be undesirable for a liquid crystal cell whose operation in response to the presence or absence of an input, or a variation in the magnitude of the input, should be predictable.

The rubbing surface treatment mentioned above with respect to obtaining homogeneous surface treatment and surface alignment of liquid crystal material may in some instances cause static electrical charge. It may be undesirable to have such a static charge on a semiconductor substrate. If the surface 30 has homeotropic alignment, such rubbing may be avoided.

The liquid crystal material 13a directly in contact with the substrate 11 tends to align and parallel, for example, in a direction from the left hand side of FIG. 1 toward the right hand side of FIG. 1 (or vice versa). Such liquid crystal material usually tends to have a tilt angle relative to the surface 20 of the substrate 11. In many instances such tilt angle is as small as a fraction of a degree up to on the order of 5 degrees and may be even larger. The liquid crystal 13a located further and further away from the surface 20 also tends to have generally homogeneous alignment but may be less and less parallel, i.e., more tilted, relative to the surface 20, as is shown schematically in FIG. 1.

Of the liquid crystal material 13, the liquid crystal material 13b directly engaged with the surface 30 of the substrate 12 tends to have homeotropic alignment. The liquid crystal material has positive dielectric anisotropy. Therefore, the liquid crystal 13 tends to align with respect to or in the direction of an electric field. As is described further below, such homeotropic alignment can be buttressed by application of a relatively low voltage electric field and continues as the field is increased.

The homeotropic alignment surface treatment 32 also may be used in a variable birefringence liquid crystal cell in which the substrate is relatively smooth or flat. An example of such a substrate would be a substrate made of glass material, plastic material, or a solid state material in which the electronic components thereof do not cause a rough, undulating, uneven, etc. surface 30. Although the invention is described having homogeneous alignment at the substrate 11 and homeotropic alignment at the substrate 12, it also is possible that such alignments are the reverse, i.e., homeotropic at substrate 11 and homogeneous at substrate 12. While not a requirement, this reversal would especially be possible if the substrate 12 were planarized to reduce the undulations, peaks, valleys, etc. in the surface 30 or if the substrate 12 were a particularly good specular reflector or had thereon a good quality reflector which reflects a high percentage of incident light.

The substrate 12 preferably is optically reflective. Therefore, light 16 entering the liquid crystal cell 10 from outside 33 the liquid crystal cell through the substrate 11 travels through the liquid crystal material 13, is reflected by the substrate 12, travels back through the liquid crystal material 13, and exits through the substrate 11 to the externally ambient 33.

The reflection characteristic of the substrate 12 may be a natural characteristic of the material of which the substrate 12 is made, including the silicon substrate and/or the electronic components 24 thereof. Alternatively, a separate coating of reflective material generally designated 34 in FIG. 1 on top of the electrode 25 is able to reflect the light 16 may be applied to the substrate 12, for example, above or below the surface treatment 32. Usually the mechanical structure of a liquid crystal cell of a display type device includes in sequential order or a stack a substrate at one side of the liquid crystal cell, a reflector, a surface treatment, and finally the liquid crystal material itself. It is possible that other parts and/or layers may be included in the "stack". Sometimes it may be possible to revise the order so that the reflector is closer to the substrate than the electrode, i.e., the reflector and the electrode reverse positions in the stack; and this is possible particularly if the electrode is transparent, for example. An exemplary coating material may be a metalized coating of aluminum. The reflective function may be provided by a dielectric stack. The reflector material should be compatible with the semiconductor circuit material and/or the electrode thereof. An advantage of aluminum reflector material and/or some other reflector materials, is that the aluminum blocks transmission of light. Therefore, the reflector can protect the semiconductor material from incident light. Many semiconductor materials are photoconducting, and it is desirable to protect the semiconductor circuit especially while writing the image to the semiconductor material, i.e. providing appropriate signals to the semiconductor parts to apply electric field to the liquid crystal thereby to create an image.

It also is possible that the substrate 12 is not reflective, but rather is optically transmissive. In such case reflection function can be provided optically beyond the substrate 12 (i.e., optically downstream) or the liquid crystal cell 10 could be used in an optical transmission control device, such as a transmissive display or other device. A display using the liquid crystal cell 10 in a light transmissive mode would require liquid crystal material which has twice the birefringence or twice the thickness of the cell to obtain the same amount of optical retardation as is obtained in a reflective mode of operation cell. Twice the birefringence or twice the actual thickness of the liquid crystal cell would double the effective optical thickness of the cell. Furthermore, if desired the liquid crystal cell 10 could be partially transmitting to project an image to the outside world or to superimpose the image created by the liquid crystal cell 10 on another image from the outside world. In such case, some of the light passing into the cell 10 to create an image by the cell could be reflected to the eye of a viewer and some of the light from a device beyond the cell 10 could be transmitted through the cell for viewing by the viewer. Other arrangements which use such a semireflective cell 10 also can be used in accordance with the invention. Even further, if the substrate 12 were transmissive, the reflector 34 or the reflector function could be provided at the substrate 11.

Briefly referring to FIG. 2, a schematic section elevation view of a variable birefringence liquid crystal cell 10', which is structurally similar to the liquid crystal cell 10, is shown. The liquid crystal cell 10' includes substrates 11, 12. A standard seal 15 may be provided at opposite edges of the liquid crystal cell 10' of FIG. 2. Exemplary seals may be an adhesive material, epoxy material, a gasket, clamping mechanism, etc., as are well known in the art. Electrical members 21', 24' are used to provide electric field across part or all of the liquid crystal material 13. Electric field may be developed by a circuit 40 that provides electrical power and/or control of input electrical power with respect to the electrical members 21', 24'. In the liquid crystal cell 10 example of FIG. 1, the electrical member 21, corresponding to electrical member 21' of FIG. 2, is an electrical coating over substantially the entire surface 20 of the substrate 11. However, if desired, a plurality of electrically conductive strips that are separated from each other may be provided. Alternatively, other types of electrically conducted members may be used for the member 21' that are suitable to cooperate in providing electrical operation of the liquid crystal cell 10'.

The electrical member or layer 24' in combination with the substrate 12 in effect is an active matrix substrate of silicon material having a plurality of electronic components therein or thereon. The substrate 12 may be other than an active matrix substrate, and electrical member 24' may be other than electrical components on an active matrix silicon substrate. For example, the substrate 12 may be glass, plastic or some other material and the electrical layer or member 24' may be thin film transistors on a side of the glass, may be an electrically conductive coating across the entire substrate 12, may be strip electrodes on the substrate 12, etc.

According to the invention a variable birefringence liquid crystal cell depicted in FIGS. 1 and 2, for example, has homeotropic alignment at least at the surface of one of the two substrates thereof. In the embodiment of FIG. 1 homogeneous alignment may be at the other substrate; and in the embodiment of FIG. 6 homeotropic alignment is at both substrates.

In the liquid crystal cells 10', specular reflection of light is caused at or in the area proximate the substrate 12. Reflection may be a result of a property of the substrate itself; for example, an active matrix substrate with electronic components on it may have a reflection characteristic such that it reflects approximately 80% of the light incident on it. Alternatively or additionally reflection function may be provided by a separate reflective layer 34 applied to the substrate 12. The reflective layer 42 may be, for example, a metallized coating applied to the electrode 24' or electrical layer. The substrate 12' may be prepared by conventional semiconductor processing techniques including masking, etching and material depositing steps. The reflective layer 42 may be put over the electrode 24' while mask material, e.g., the photoresist mask used to fabricate the semiconductor device, still is left in place on the electrode. The mask material then insulates the electrode from the reflector.

The power and control circuit 40 may be a conventional electrical power supply and control of the power or voltage to the liquid crystal cell 10', such as those circuits commonly used in liquid crystal display devices of the variable birefringence type. For example, the circuit 40 may provide a relatively low voltage to achieve one alignment relationship of liquid crystal material 13 and a relatively larger magnitude voltage to obtain a different alignment relationship. The circuit 40 may be used to provide only a single level voltage that is sequenced in a desired way to obtain one alignment characteristic and is sequenced in a different way and/or voltage level to achieve a different alignment characteristic of the liquid crystal 13. The circuit 40 may provide for multiplexed operation of the liquid crystal cell 10', if desired. The circuit 40 may provide a range of output voltages intended to obtain a corresponding range of alignment characteristics of the liquid crystal material 13 in the liquid crystal cell 10' and thereby to obtain a corresponding range of optical phase retardation characteristics.

Referring back to FIG. 1, the following description is based on the exemplary liquid crystal cell 10 having a transparent top substrate 11 and a non-planer reflective active matrix semiconductor bottom substrate 12. The top substrate 11 is treated to provide generally homogeneous alignment to the liquid crystal material relatively proximate thereto. The bottom substrate 12 is treated to obtain generally homeotropic alignment of the liquid crystal material relatively proximate thereto.

In FIG. 1 are illustrated numerous oval shapes or ellipses intended generally to depict the nematic liquid crystal material 13 in the cell 10 and the approximate alignment characteristics of that liquid crystal material in the area where the oval is located. Where the major axis of the oval generally is horizontal, i.e., generally in parallel to the substrate 11, homogeneous alignment exists; and where the major axis of the oval is vertical, the alignment of the liquid crystal material in that area is homeotropic. A given oval represents a substantial amount of liquid crystal material, not just a single liquid crystal molecule; such ovals, dashed lines, and other types of representations are used conventionally to depict the liquid crystal material and alignment thereof, as is conventional.

The liquid crystal material 13a is included in a surface layer 43 of liquid crystal 13, and the liquid crystal 13b is included in a bulk layer 44 of liquid crystal material 13. As is seen in FIG. 1, liquid crystal material between the homogeneously aligned liquid crystal 13a and the homeotropically aligned liquid crystal 13b tends to be aligned at an angle other than homeotropic or homogeneous. In FIG. 1 that liquid crystal material which tends to have alignment which is more nearly homeotropic is indicated as a bulk layer 44 of liquid crystal material 13, and that liquid crystal material which tends to be more homogeneously aligned than homeotropically aligned is labeled the surface layer 43. The liquid crystal material is birefringent.

In operation of the liquid crystal cell 10 optical phase retardation is increased when plane polarized light is transmitted across the extraordinary direction of the liquid crystal material. However, optical phase retardation usually is not affected when the plane polarized light travels along the liquid crystal axis, usually referred to as the ordinary axis.

From the foregoing, then, it will be appreciated that the surface layer 43 will have a greater impact on optical phase retardation than will the bulk layer 44 of the liquid crystal material shown in the liquid crystal cell 10. The actual thickness of the surface layer 43 and of the bulk layer 44 may vary and may be selected as a function, for example, of the particular liquid crystal material used, the birefringence characteristic thereof, the indices of refraction thereof, the response thereof to application of electric field, and possibly other characteristics. It is intended that as the magnitude of electric field applied across the liquid crystal cell 11 increases, the amount of optical phase retardation will decrease, and vice versa. Therefore, in a sense, as the magnitude of electric field increases, the thickness of the surface layer 43 decreases and the thickness of the bulk layer 44 increases; and vice versa as the magnitude of the electric field voltage is decreased.

Application of electric field to the liquid crystal cell 10 tends to enhance the uniformity of homeotropic alignment of the liquid crystal material 13b adjacent the surface 30 of the substrate 12 so that peaks and valleys, undulations, etc., in the surface 30 will not cause the liquid crystal material there to follow such uneven surface. Since light 16 traveling through the liquid crystal 13b travels along the ordinary axis of the liquid crystal material and experiences primarily the ordinary index of refraction thereof, increased path length through the liquid crystal material 13b will not increase the optical phase retardation of the light 16. However, as the area 45 between the surface layer and the bulk layer 43, 44 moves toward or away from the substrate 11 to decrease or to increase the thickness of the surface layer 43, optical phase retardation effect on the light 16 correspondingly will be decreased or increased. Alignment of liquid crystal material in the bulk layer 44 tends not to be significantly altered, whereas alignment of liquid crystal material in the surface layer 43, particularly that liquid crystal material that is adjacent the bulk layer 44, tends to alter alignment as the applied field increases or decreases.

Reference to the surface layer, bulk layer, and area therebetween 43–45 is intended to refer to approximate locations in the liquid crystal cell 10 and approximate portions of the liquid crystal material. Usually there is no precise location where the surface layer ends and the bulk layer begins. Rather, there is a somewhat uniform and gradual transition (the transition may be sharper or more gradual than that illustrated) between the surface layer in which a more significant amount of optical phase retardation would be expected to occur and the bulk layer where a less significant amount of optical phase retardation would be expected to occur. That is to say, the alignment of liquid crystal in part or even in all of the bulk layer may be other than perfectly homeotropic and alignment in the surface layer may be other than perfectly homogeneous. However, such alignments are sufficiently different that most of the optical phase retardation occurs in the surface layer.

The liquid crystal cell 10 may be approximately six microns thick, that is the thickness of the liquid crystal material 13 or the distance between the surfaces 20, 30. Since the liquid crystal cell 10 is reflective, whereby light 16 travels through the liquid crystal material 13 twice, the effective thickness of the liquid crystal cell 10 would be about 12 microns. In operation of the liquid crystal cell 10, though, optical retardation primarily is provided by the surface layer 43 of liquid crystal material. The actual thickness of the liquid crystal cell may be greater or less than six microns. The actual thickness dimension selected may be a function of the birefringence characteristics of the liquid crystal material, index of refraction characteristics of the liquid crystal material, dielectric anisotropy characteristics of the liquid crystal material, other electrical or optical characteristics of the liquid crystal material, speed of response desired, energy requirements and availability, and possibly other characteristics or parameters.

In operation of the liquid crystal cell 10, absent application of an electric field or any energization of the liquid crystal cell, the liquid crystal 13*a* will have generally homogeneous alignment in proximity to the substrate 11. The liquid crystal material 13*b* in proximity to the surface 30 of the substrate 12 will have generally homeotropic alignment. Due to the undulations in the surface 30, it is possible that some of the liquid crystal material 13*b* may be aligned in a direction that is altered relative to a direction perpendicular to the generally flat plane of the silicon 23. The liquid crystal material 13 will provide optical phase retardation with respect to a plane polarized light 16. This at rest condition exists when the liquid crystal cell 10 has been at rest for a period of time such that there is no alignment effect due to application of electric field at that time or immediately preceding that time. The cell 10 may provide more than ¼ lambda retardation in the at rest condition. Therefore, when the cell 10 is operated at the preconditioned and fully energized states described below between maximum desired controlled retardation of, for example, ¼ lambda (½ lambda for the combined incident and reflected passes of light through the cell) or some other desired amount of retardation and minimal retardation (zero retardation or near zero retardation) can be achieved.

Upon application of a minimal level electric field, the tendency of the liquid crystal material 13*b* to have homeotropic alignment is buttressed by such field. Such electric field, though, would have relatively minimal impact on the liquid crystal 13*a* in the surface layer 43 due to the relatively stronger influence of the surface 20 and homogeneous alignment layer 22 on the liquid crystal material 13*a*. In this pre-aligned condition or pre-conditioned state of the liquid crystal cell 10, the liquid crystal material 13 provides optical phase retardation to the plane polarized light 16. The pre-aligned condition is obtained in the illustrated example by applying a relatively low voltage electric field across the liquid crystal cell 10. However, such pre-aligned condition of the liquid crystal material can be obtained by other means, such as by periodically applying a relatively larger electric field to the liquid crystal material and permitting the liquid crystal material subsequently to relax, and then repeating application of the field. Also, mechanical or magnetic field means or other means or driving technique may be used to obtain the pre-aligned condition.

By increasing the voltage of the electric field, more of the liquid crystal material in the bulk layer 44 tends to align substantially homeotropically like the liquid crystal 13*b*, and some of the liquid crystal material in the surface layer 43 tends to align homeotropically, thus reducing the thickness of the surface layer 43. Ideally all of the liquid crystal material in the surface layer 43 would align homeotropically in response to application of a maximum voltage electric field; however, in practice this usually is not the case. Rather, at least a relatively thin layer of liquid crystal material 13*a* will remain in at least partial homogeneous alignment even when a relatively large voltage electric field is applied. In any event, upon application of such relatively large voltage, the amount of optical phase retardation provided by the liquid crystal material 13 to plane polarized light 16 will be reduced to a minimum. Compensation for residual optical phase retardation due to the liquid crystal material 13*a* that does not align with respect to a relatively large voltage electric field can be provided, for example, in the manner disclosed in U.S. Pat. No. 4,385,806.

The compensation for residual birefringence can be provided by using an evaporated wave plate. The evaporated wave plate may be applied directly on the glass, quartz or other transparent substrate 11. Alignment of the slow axis of the wave plate preferably is such as to remove or to reduce the affect of residual birefringence of the liquid crystal cell 10. For example, the slow axis of such compensating wave plate may be at 90 degrees to the rub direction of the homogeneously aligned liquid crystal material 13*a*, for example. The compensating wave plate may be a quarter wave plate, a ¹⁄₁₀th wave plate, and so on, as may be desired to provide the desired amount of compensation.

In the example described above of liquid crystal cell 10 in FIG. 1, upon application of maximum voltage electric field, zero optical phase retardation occurs (zero optical phase retardation includes the possibility of a relatively small amount of residual optical phase retardation mentioned above). Upon application of a reduced voltage electric field to obtain the pre-alignment condition mentioned above for the liquid crystal material 13, the liquid crystal material 13 provides a specified amount of optical phase retardation. For example, such specified amount of optical phase retardation may be one-quarter wave retardation on each pass of light through the liquid crystal 13. One quarter wave retardation is applied or occurs as the light 16 is directed toward and travels to the surface 30 and one-quarter wave for the light 16 reflected away from the surface 30 and travelling to the substrate 11, for a total sum of one half wave retardation. Alternatively, the liquid crystal cell 10 may be used to provide more or less than a total of half wave optical phase retardation when the liquid crystal material is in the pre-aligned condition. It is possible to vary the optical phase retardation between minimum (e.g., zero) and maximum (e.g., ¼ wave) in a step function by adjusting the voltage of the electric field, respectively to the maximum or to the minimum. The amount of optical phase retardation also can be varied substantially continuously over a range between and including the minimum and maximum by fully varying the voltage of the electric field to the liquid crystal between and including the relatively low level that provides the pre-aligned condition and the relatively high level that provides the substantially zero optical phase retardation.

When the liquid crystal cell 10 is in the fully de-energized or rest state absent any electric field, the amount of optical phase retardation ordinarily would be more than that occurring during the low level energization pre-aligned condition. Low level energization sets up the pre-conditioned alignment of the liquid crystal material which may help buttress homeotropic alignment at the substrate 12 and which may establish a prescribed amount of optical phase retardation provided then by the liquid crystal material, for example, by adjusting the effective thickness of the surface layer 43. As is mentioned elsewhere herein, other techniques to provide pre-conditioning of the liquid crystal material also may be used, such as mechanical, magnetic or some other means and/or technique.

In some circumstances, if the homeotropic alignment provided by the surface treatment 32 is rather precise and does not require buttressing by application of a relatively low voltage electric field, or if the nonuniformity and optical phase retardation across the face of the liquid crystal cell due to the misalignment occurring in the homeotropically aligned liquid crystal 13b and/or the increased path length or decreased path length due to peaks and valleys 30p, 30v for the light ray 16 can be tolerated or accepted, it is possible that the pre-aligned condition and the fully de-energized condition of the liquid crystal cell 10 may be the same. In such case, no separate low voltage electric field is required to obtain the pre-aligned condition; rather, such pre-aligned condition would be acceptably obtained by the surface treatment 32, for example. Substantially maximum optical phase retardation of which the cell 10 is capable would occur at that time. However, upon application of electric field, the amount of optical phase retardation would be reduced.

The liquid crystal cell 10 may be used as a shutter for simultaneously providing substantially the same amount of optical phase retardation to all light incident thereon. Such shutter effect may be provided substantially continuously or may provide a field sequential type operation or effect (sometimes referred to as frame sequential operation or effect) whereby one optical phase retardation condition exists and subsequently a different optical phase retardation condition exists; and such operation is repeated periodically. Other types of field sequential or frame sequential operation of the liquid crystal cell 10 as a shutter also may be employed as will be evident to those who have ordinary skill in the art from the description herein. For example, in a color sequential addressing mode of operation described below, the cell 10 may be used in a display to present respective color parts of an image at different times in sequence and the eye can integrate or add those images to form a full color image that is a still image or has motion.

In FIGS. 3A and 3B are waveforms depicting the response time of a variable birefringence liquid crystal cell 10 relative to electrical energization thereof. In FIG. 3A prior to time $t_1$ a relatively high voltage AC signal 48 shown in FIG. 3B, e.g., at 18 volts peak to peak and a frequency of from about 30 Hz to about 10 KHz, is applied to the liquid crystal cell 10; and the liquid crystal cell provides zero (or nearly zero) optical phase retardation, since substantially all liquid crystal material 13 therein is homeotropically aligned and other optics in a display 49 (FIG. 5) in which the liquid crystal cell 10 is used (described further below) bloch light transmission.

At time $t_1$ the voltage 48 is reduced to, for example, from about zero to about 5 volts, depending on whether (and to what extent needed) or not voltage is needed to obtain the pre-aligned condition of the liquid crystal material 13. It takes about 5 ms for the liquid crystal cell 10 and display 49 to achieve full transmission thereafter as is shown in the drawing.

At time $t_2$ the voltage of the signal 48 again is increased to relatively high voltage; and the liquid crystal cell and display again assume a light blocking state. It takes approximately 1 ms from the time the relatively high voltage is applied until such light blocking state occurs.

As is usually the case and is depicted in FIGS. 3A and 3B, measurement of turn off and turn on times for the liquid crystal cell 10, i.e., removing high voltage and applying high voltage, respectively, to assume respective transmission states of the display 49 is between about ten percent (10%) transmission and about 90 percent (90%) transmission. In the illustrated example, the display 49 using liquid crystal cell 10 is driven to dark condition or minimum transmission condition by applying relatively high voltage electric field; and it assumes the maximum transmission condition at relatively low (or zero) voltage electric field. However, it will be appreciated that the opposite operation can be used, whereby maximum and minimum transmission occur in response to maximum and minimum electric field, respectively. Also, preferably the electrical signal applied to the liquid crystal material is an AC signal, and, as usually is the case, the liquid crystal material responds to the rms value of the applied voltage electric field. However, in some circumstances it is possible to operate the liquid crystal cell 10 by a DC voltage, a pulsed DC voltage, etc.

The voltages, times, parameters and other dimensions described herein are exemplary. It will be appreciated that voltages, times, parameters and other dimensions may be used or selected for use in a liquid crystal cell and display using such cell in accordance with the present invention.

The relatively fast operation of the liquid crystal cell 10 described above enables the liquid crystal cell and a display using that cell to operate satisfactorily in a frame sequential or field sequential mode of operation. The invention may be used with a time sequential addressing scheme to create multiple images at different sequential times in order to produce multicolor images. For example, as was mentioned above, at one time one image can be produced; and subsequently another image can be produced; the speed at which such images are produced can be integrated by the human eye, i.e., by a person watching the images being produced. Therefore, the display 49 can be illuminated with red light and a red image can be produced; and at subsequent times blue and green light, respectively, can illuminate the display 49 while the display creates different respective blue and green images. The eye can integrate the respective images to see a full color image. The relatively fast operation of the liquid crystal cell 10 also allows a mouse curser or some other display image to be moved relatively quickly across a display without encountering any smearing or there remaining a residual image.

Advantages which inure to field sequential operation to produce a color image by the display include increased resolution and increased brightness of the display compared to conventional displays which use color filters. Each pixel of the liquid crystal cell 10 and display 49 using the cell is able to control each of the colors of light provided to illuminate the display; such control is provided at different time sequenced periods. However, since there is no need for a separate color filter for each color produced by a pixel, all light of a color delivered to the pixel can be controlled, and, if desired, output by the display. Additionally, since the entire pixel is used to control brightness of a particular color at any given time, and there are no color filters used to block light of the other colors at that given time, only one active light control device per pixel is required (rather than three, as in conventional r,g,b color filter devices), thus enhancing resolution.

Another advantage of the present invention is the increased optically operative portion of the pixel compared to prior art liquid crystal display devices. Since the substrate 12 is an active matrix semiconductor substrate and the liquid crystal cell 10 is operated in reflective mode, the transistors and other electrically operative portions of the circuitry used to provide voltage to the electrodes 25 and the electric field developed as a result of such voltage, can be located beneath the electrode 25 so the transistor, etc., does not interfere with the light reflection function. In fact the transistor, or part of it, can be located beneath the surface of the semiconductor substrate 23 which forms surface 30 of the substrate 12, which may help in the surface 30 of the substrate being smooth or planar. CIf the surface 30 were relative smooth or planar, sometimes referred to as planarized, the alignment of liquid crystal material there may be homogeneous and that at the surface 20 of the substrate 11 homeotropic.) Since each pixel then can control substantially all of the light incident thereon without having substantial "optically dead area" where the transistor is located, both brightness and resolution are increased relative to conventional transmissive liquid crystal display systems.

Increased brightness and resolution improves the output of the display 49 compared to prior art liquid crystal displays. Also, the intensity (brightness) of the light source can be reduced while high quality, good resolution and bright images can be created; and by reducing the light intensity or brightness requirements, the power consumption of a display 49 according to the invention can be reduced compared to prior art displays. Reduced power consumption facilitates using the liquid crystal cell 10 and display 49 in various portable head mounted displays, including those which are battery powered.

Each component 24 of the substrate 12 may be energized to cooperate with the conductor 21 on the substrate 11 to provide an electric field therebetween. Such electric field generally is confined to the area directly between the respective component 24 and the electrode 21. There is relatively little impact of the field in the area directly between the electrode 25 of a component 24 and the electrode 21 and the liquid crystal 13 in the area between a relatively adjacent electrode 25 and the electrode 21. Therefore, the electrical component 24a at the left hand side of the liquid crystal cell 10 illustrated in FIG. 1 can be energized to apply electric field to the liquid crystal in the area 50a while the electrical component 24b adjacent to component 24a is not energized so that electric field is not applied to the liquid crystal material in the area 50b (or a relatively low level voltage electric field is applied by the component 24b to obtain the pre-aligned condition for the liquid crystal material in the area 50b). Thus, each electrical component 24a, 24b, etc. may be selectively energized or not to apply desired electric field or not to the liquid crystal material in the area between the respective component and the conductor 21 at the substrate 11. Selective control of the electrical components 24a, 24b, etc. enables the liquid crystal cell 10 to provide different amounts of optical phase retardation for light at the respective areas 50a, 50b, etc., thus providing different phase modulation of such light. The respective areas 50a, 50b, etc., and respective corresponding electrical components 24a, 24b and respective portions of electrode 21 may be considered respective picture elements (sometimes referred to in the art as pixels) 51a, 51b, etc. By providing different amounts of phase modulation to light by respective pixels and then decoding the modulation using appropriate analyzing apparatus, such as by a cholesteric liquid crystal reflector, one or more optical plane polarizers, and/or other optical elements, light transmission is controlled and images can be created.

As was mentioned above, the ellipses shown in the drawing of FIG. 1 represent alignment or orientation of a quantity of liquid crystal material in the area of the respective ellipse, such alignment being generally along the direction of the major axis of the ellipse. The actual size of the ellipses is not intended to be indicative of the actual size of liquid crystal molecules. The liquid crystal cell 10 is depicted schematically in FIG. 1. The actual dimensions of the various parts of the liquid crystal cell 10 are not intended to be proportional to the actual dimensions of a liquid crystal cell constructed in accordance with the invention, for example, having a thickness of liquid crystal layer 13 on the order of about six microns.

Use of a silicon material as the substrate 12 permits part, or preferably all, of the circuits for developing electric field and driving the liquid crystal material 13 to respective orientations on or preferably in the substrate. The silicon substrate also may include auxiliary circuits used for control, signal conditioning, multiplexing, etc. Memory (RAM) may be included as part of the substrate to increase the performance capabilities of a display using the cell 10, for example, as is the case in computer video cards which include memory on board. Thus, the substrate may be a single "chip" containing all or substantially all the electronics required for operating the liquid crystal cell 10. Other circuitry also may be included as part of the substrate.

In operating the circuitry, for example, including circuitry 40 and components 24, the columns and rows of pixels 51a, 51b, etc. are driven by timing pulses, e.g., to the columns, and using shift register arrangements, appropriate signals can be delivered to the rows of pixels. Information for operating respective pixels can be applied to the display one line at a time, for example, e.g., as information is supplied to a conventional RAM. Depending to the nature of the signal applied to respective rows when timing signals are applied to respective columns, a particular pixel will be turned on or not to apply electric field to the liquid crystal between the respective electrode 25 and electrode 21. Since the electrical operation of the circuitry 40 and components 24 can be quite fast and since operation of the liquid crystal cell 10 also can be quite fast in switching from one liquid crystal orientation to the other, the illumination of the cell 10 can be turned off while the cell switches to a desired state and then the illumination can be turned on. This fast operation capability of the liquid crystal cell 10 and of the circuitry associated with it facilitates use in the color sequential addressing operation described above. Thus, using the just described operation the cell 10 would be illuminated by one color light and would produce an image of that color; subsequently the cell would be illuminated with a different color light and would produce another part of the same image; and so on as was described further above. The actual color operation may be according to computer graphics or NTSC convention.

Although liquid crystal cell 10 is shown as a single cell, it will be appreciated that a display 49 or other device may use a single cell 10 or a plurality of cells 10. If a plurality of cells 10 are used in a display, for example, the cells may be located in relation to each other to form an image whereby one part of the image is formed by one of the cells and another part of the image is formed by another cell, and so on.

Referring to the FIG. 4, a head mounted display 60 includes a pair of display systems 61, 62 and a control system 63 for creating images intended to be viewed by the eyes 64, 65 of a person. The display systems 61, 62 may be positioned in relatively close proximity, for example, at approximately one inch distance, to the respective eyes 64, 65. A mounting mechanism, such as temple pieces 66, 67 and a nose bridge 68 may be provided to mount the display 60 on the head of the person.

The control system 63 in conjunction with the display systems 61, 62 are intended to create images for viewing by the eyes. Those images may be monochromatic. The images may be multicolor. The images may be two-dimensional or they may provide a three dimensional, stereoscopic effect. Stereoscopic effect viewing is obtained when the control system 63 operates the display systems 61, 62 to provide, respectively, right eye and left eye images that are sufficiently distinct to provide depth perception. Right eye, left eye imaging and depth perception are techniques used in some stereoscopic imaging and viewing systems which are commercially available.

The display systems 61, 62 may be identical. The control system 63 provides control and/or power input to the display systems 61, 62 to create images for display to the eyes 64, 65. The display 60 may be a head mounted display, such as a heads-up display, a virtual reality display, or a multimedia display. The control system 63 may be generally a control system of the type used in known head mounted displays to create such images. Such a control system may provide for control of color, light intensity, image generating, gamma, etc. The display systems 61, 62 may include focusing optics so as to focus the image created by the display systems for comfortable viewing, for example from a few inches up to a few feet in front of the eyes, say, from about 20 inches to about several feet in front of the eyes.

It will be appreciated that the features of the liquid crystal cell 10 of the present invention may be used in the display 60 of the head mounted type. Also, features of the invention may also be employed in other types of display systems. One example is a display system that uses only a single display system of the type described herein. Such display system may be located in proximity to an eye for direct viewing. Alternatively, such display system may be used as part of a projection type display in which light from the display system is projected onto a surface where the image is formed for viewing. Various lenses and/other optical components may be used to direct from the display system light to create an appropriate image at a desired location.

Figure 5:
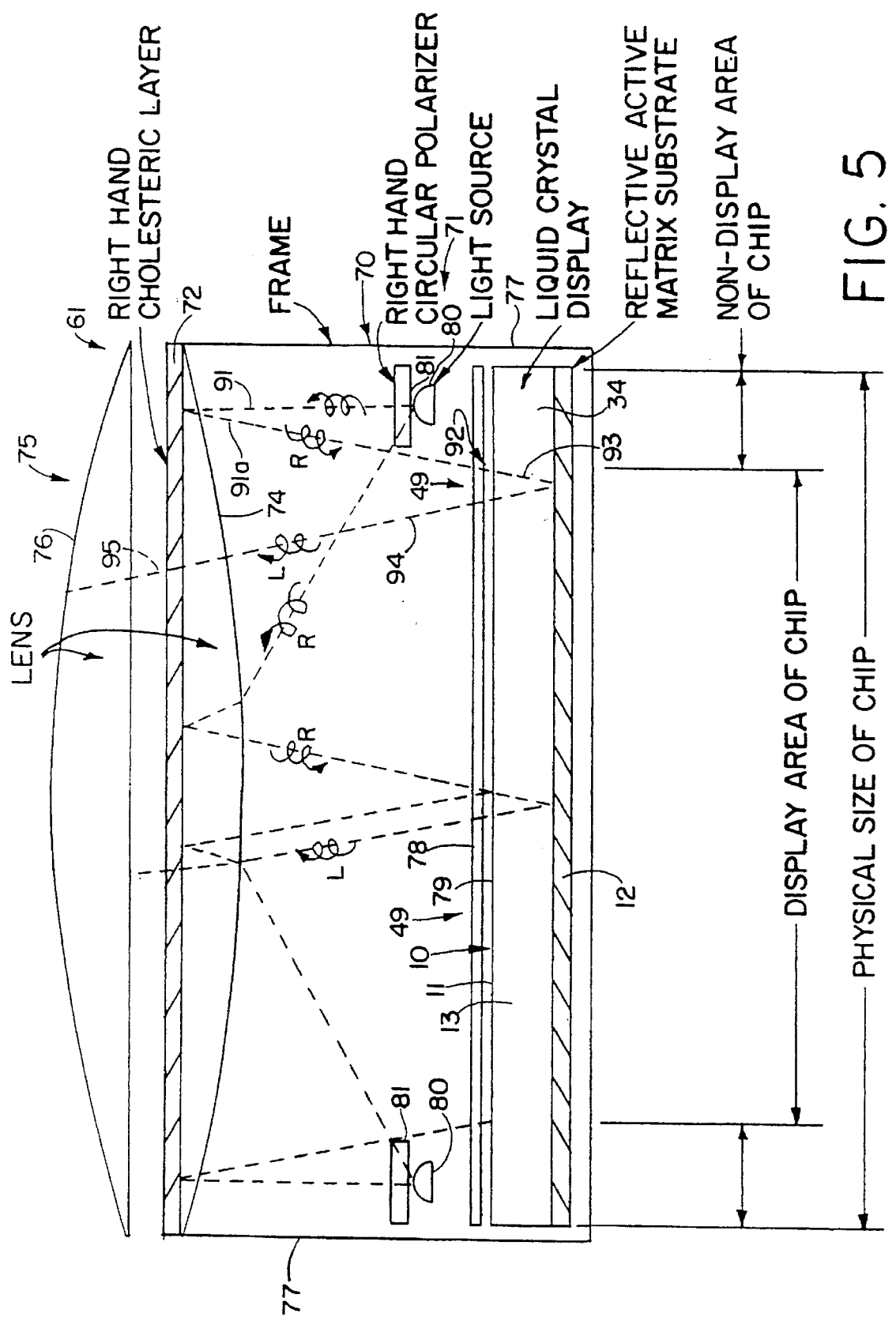
FIG. 5 is a schematic side elevation view of a display system using the display of FIG. 3 employing a reflective variable birefringence liquid crystal cell.

Turning to FIG. 5, an illumination system 70 used in a display system 61 is illustrated. The illumination system 70 is folded. The folded illumination system reduces the thickness or depth requirement for the display system 61 while still allowing for substantially uniform illumination in the display system. Details of the display system and system 60, 61 and illumination system 70 are discussed in copending, commonly owned U.S. patent application Ser. No. 08/187, 162 filed concurrently herewith. Such application is entitled "Illumination System For A Display", and the entire disclosure thereof hereby are incorporated by reference.

As is seen in FIG. 5, the illumination system 70 includes a source of polarized light 71 and a cholesteric liquid crystal reflector 72 (sometimes referred to as an analyzer) which is able to transmit or to reflect light as a function of the wavelength of the light and the circular polarization characteristic of the light. Light from the illumination system 70 is directed to the front or face of a display 49 which includes the liquid crystal cell 10. Light from the display 49 is reflected toward the reflector/analyzer 72 for transmission thereby to be viewed, projected, or for reflection, etc. A lens 74 may be included in the illumination system 70 to help distribute light substantially uniformly across the area of the display 49. The lens 74 also may be part of an optics system generally designated 75, which may include one or more lenses, mirrors, and/or other optical elements, one such lens 76 being shown in FIG. 5. The lens 74 and optics system 75 may cooperate to provide an image focused at a comfortable distance relative to and for viewing and focusing by the eye of a viewer, to project an image onto a screen, etc. The various components of the illumination system 70 and display 49, which form the display system 61 may be mounted in a frame or other support 77.

In the illumination system 70, the source of polarized light 71 is shown in FIG. 5 as a light source 80 and a circular polarizer 81. An exemplary light source 80 is a light emitting diode. The light emitting diode may have a light output of a specific wavelength or it may have a light output over a band or range of wavelengths. In the latter case, it may be desirable to filter the light from the light emitting diode 80 by a conventional color filter (not illustrated) to block one or more wavelengths or wavelength bands of light in order to coordinate the wavelength or wavelength band of the light incident on the reflector 72 with respect to the wavelength-determined reflection characteristics of the reflector.

An advantage to using circularly polarized light in the display 49 is the minimizing of the retardation effects in spaces between pixels viewed in the display. For example, since circularly polarized light is provided by the source 70, there is less difference in retardation of light in the spaces between pixels than would occur if plane polarized light were used. As a result the space between pixels is less apparent when the display 49 is viewed, and the wire frame effect often referred to in display technology is less objectionable compared to prior art liquid crystal displays. Since circularly polarized light preferably is used in the display 49 of the display system 61, and since the analyzer 72 is operative to distinguish between left and right circular polarized light, the light transmitted through the analyzer is in proportion to amount of light which is left or right circularly polarized even though there may be a shift in the direction of the direction of the axis of the elliptical (or plane) polarized light incident on the analyzer.

The light source 80 may be a plurality of light emitting diodes located about the outer perimeter of the display 49, for example, outside the viewing area or active area of the display, located either in front of or laterally adjacent an edge of the display, for example. Two of such light emitting diodes 80 are shown in FIG. 5. Alternatively, a single light emitting diode light 80 may be used in the illumination system 70.

Other exemplary light sources which may be used in connection with the invention include fluorescent light sources, incandescent light sources, metal halide lamps, and light channeled by fiber optics from a source internal or external of the frame 77 of the display system 61. The light source may be monochromatic. Alternatively the light source may be multicolor and even may be white. A white light usually includes all colors or substantially all colors. The light source may include red, green and blue components that can be used to provide a full color system, as is described in greater detail below. The light source 80 may also be a metal halide lamp, such as one which produces light having red, green and blue spectral peaks. Thus, it will be appreciated that various devices may be used as the light source 80. For brevity, reference below to the light source 80 will be with respect to light emitting diodes, however, it will be appreciated that other light sources alone or in combination with light emitting diodes or in combination with each other also may be used in the invention.

The polarizer 81 is a circular polarizer, the handedness of which is coordinated with the characteristics of the reflector 72. The polarizer 81 may be a left handed circular polarizer or a right handed circular polarizer. Alternatively, the polarizer 81 may be composed of plural polarizers, which cooperate to form a circular polarizer; an example is a linear polarizer (sometimes to referred to as a plane polarizer) in optical series with a quarter wave plate, the appropriate axis of which is oriented at 45 degrees relative to the transmission axis of the linear polarizer, as is known. It will be appreciated that light sources and polarizers other than those described herein, but which functionally are equivalent to provide a source of polarized light 71 may be used in the illumination system 20 of the invention.

The reflector 72 is formed of cholesteric liquid crystal material or equivalent providing the equivalent functions described herein. Cholesteric liquid crystal material tends to reflect circularly polarized light that has the same direction, i.e., left handed or right handed circular polarization, or same handedness, as the left or right handedness of the twist characteristic of the cholesteric liquid crystal material, provided the wavelength of the incident light on the cholesteric liquid crystal material is of a wavelength or within a wavelength band that is determined by the composition, pitch, or other characteristic of the cholesteric liquid crystal material. Therefore, in the case of cholesteric liquid crystal material having a right handed twist and being operative to reflect green light of right handed polarization, upon the directing of green right handed polarized light from the light source 71 onto the reflector 72, such light will be reflected by the reflector to illuminate the display 49. Light that is left handed circularly polarized and/or that is not green or within a suitable wavelength band that includes green light, is transmitted by the reflector 72.

The combination of the light source 71 and the reflector 72 provide a folded optical path for light travel from the source to the display. The folded path helps reduce the thickness requirement for the display system 61 and also provides bright efficient illuminating of the display. Since a cholesteric liquid crystal reflector is an efficient reflector, often more efficient than a specular reflector for the particular wavelength and polarization characteristic of incident light, bright, substantially uniform illumination of the display 49 is possible by the illumination system 70. The reflector 72 preferably is operative to reflect light from the light source 71 to the liquid crystal cell 10 so the light is incident on the cell reasonably close to normal, i.e., perpendicular to the face of the cell.

The folded paths used in the liquid crystal cell 10 and in the illumination system 70 of the display 49 minimize the size of the display system 61, for example. Such minimization tends to reduce the weight of the display system 61 and facilitates using it in a head mounted display. In an exemplary head mounted display, the viewing area of each liquid crystal cell and display system 61 may be on the order of approximately 0.75 inch diagonal. A display 49 according to the invention may have a pixel resolution of, for example, 360 columns by 256 rows, with a pixel pitch at 40 microns by 40 microns, an array size of 0.906 inch by 0.660 inch and 0.708 inch diagonal. The display may be operable sufficiently fast to provide images at the speed of approximately 180 frames per second. Power to the circuitry of substrate 12 may be less than 2 watts with voltage being supplied at between about 30 V DC and about 35 V DC. Signal formats may be interlaced or non-interlaced. Also, one may use 30 frames per second operation. One also may use 1 micron geometry or 3 micron geometry for the pixels. These values are provided by way of example and are not intended to be limiting.

The high resolution and brightness capabilities of the invention cooperate to provide for an efficient head mounted display as to size, weight, quality of image, minimizing power requirements, and so on. The liquid crystal cell 10 and display 49 may be embodied in a projection type display. In such a case images produced by the display 49, for example, can be projected onto a screen, a wall, etc., for viewing.

The display 49 includes the liquid crystal cell 10. The display 49 also may include a quarter wave plate 78 positioned optically upstream/downstream, i.e., in front of the face 79 of the liquid crystal cell 10 to intersect light incident on and received from the face 79. The slow axis of the quarter wave plate is oriented relative to the rub direction or primary alignment direction of the homogeneously aligned liquid crystal material 13a proximate the substrate 11. The quarter wave plate therefore tends to convert the circularly polarized light from polarizer 81 to linearly polarized light having a plane of polarization such that optical phase retardation of such plane polarized light transmitted through the liquid crystal cell in a sense effects a rotation of that plane of polarization or otherwise alters the state of polarization of light transmitted through the liquid crystal 13. The quarter wave plate 78 ordinarily would provide quarter wave retardation for only one wavelength of light; and the amount of retardation provided other wavelengths may vary. If the angular relationship between the slow axis of the quarter wave plate and the primary rub direction of the homogeneously aligned liquid crystal material 13 is at an angle different from 90 degrees relation, chromaticity characteristic of the display 61 tends to increase; the greater the difference from that 90 degrees relationship, the greater the chromaticity and the smaller the difference the smaller the chromaticity characteristic and the less critical chromaticity considerations become. Thus, the quarter wave plate permits the display system 61 including the cholesteric reflector 72 to produce a dark field condition. The quarter wave plate 78 also converts plane polarized light received from the liquid crystal cell to elliptically polarized light the characteristics of which are a function of the plane of polarization of the plane polarized light received from the liquid crystal cell 10.

It will be appreciated that the reflective or folded light path characteristic of the liquid crystal cell 10 traveled by light 16 in FIG. 1, for example, complements or dovetails with the folded light path of the illumination system 70 of the display system 61. Also, the cholesteric liquid crystal reflector 72, as is described in the above referenced concurrently filed patent application, complements with the folded light paths of both the illumination system and the liquid crystal cell 10 to help direct light to the cell at an angle that is reasonably close to normal to provide for accurately formed high quality images produced by the display 49.

Operation of Display System 61 with a Display 49 using Liquid Crystal Cell 10 Illuminated by the Illumination System 70.

In FIG. 5 the polarization characteristics of a light ray as it travels from the light source 80 to the eye 64 of a viewer is shown. Light symbolized by light ray 90 emitted by the light emitting diode 80 is unpolarized. The polarizer 81 placed in front of the light emitting diode 80 converts the light ray 90 to right circularly polarized light 91. The light ray 91 is refracted by the lens 74 and is reflected by the cholesteric liquid crystal reflector 72. The reflected light ray 91 remains right circularly polarized, as is depicted at light ray 91a.

The light ray 91a may be converted to plane polarized light by the quarter wave plate 78 and enters the front face 79 of the display 49 at 92 and then is designated light ray 93. In the display 49 the polarization characteristic of the light ray 93 may or may not be changed. Such a change would be a function of the characteristics of the display 49, e.g., whether or not it retards light transmitted therethrough.

The polarized light my 93 is reflected by the reflector associated with the liquid crystal cell 10, e.g., by substrate 12 and passes back through the liquid crystal material 13. Such reflection alters the polarization state or condition of light 93; and further optical phase retardation may occur as the light ray travels back through the liquid crystal material 13. The quarter wave plate 78, if used, changes or alters the phase of the light 93 received from the liquid crystal cell 10, for example, altering phase of elliptically polarized light, or, if appropriate alignment, wavelength, and polarization conditions exist for the light incident on the wave plate 78, such wave plate can change incident linearly polarized light (or possibly some of such light) to elliptically polarized light. Such elliptically polarized light may actually be circular or plane depending on the orientation of the plane of polarization, for example, and wavelength(s) of light 93 relative to the slow axis of the quarter wave plate 78. The reflection mentioned just above preferably is specular reflection by reflector 34; such specular reflection affects circularly polarized light by reversing the direction of polarization; the specular reflection does not change the direction of plane polarized light. For plane polarized light there is a phase change at the surface of the reflector 34, but the change is the same for both components of plane polarized light so that the direction of polarization does not change. However, the circularly polarized light changes direction of rotation, e.g., from right circularly polarized light to left or vice versa. For elliptically polarized light the reflector 34 changes the phase of the light incident on it and reflected by it.

The elliptically polarized light 94 in effect is comprised of left and right circularly polarized components, which may have different amplitudes and are out of phase. The lens 74 refracts the light 94, and the cholesteric liquid crystal reflector 72 transmits the left circularly polarized component 95 and reflects the right hand circularly polarized component. The light 95 is refracted by lens 76 and is subsequently viewed directly by an eye or by projection onto a screen, etc.

The lighting pattern in the illumination system 70 used in an exemplary display system 61 is shown schematically in FIG. 5. The cholesteric liquid crystal reflector 72 is spaced from the display 49 by a distance equal to about half the diagonal of the display 49. In the illustrated example the display 23 is approximately square in viewable area. The shape of the lens 74 and the emission pattern of the light emitting diode light source 80 are adjusted so that each of the illustrated two light emitting diodes 80 would illuminate about half the face 78 of the liquid crystal cell 10 of the display 49. In this way the angle of incidence of the light rays on the lens 74 and hence the cholesteric liquid crystal reflector 72 will not be too oblique. The less oblique, the larger the viewing angle of the display 49 without degradation of the viewed image by allowing the wavelength of the light emitted by the diodes 30 to remain within the reflective band of the cholesteric liquid crystal material.

The lens 74 may be part of a lens system of a virtual reality display or other heads-up display or head mounted display in order to place the image created by the display system 61 at a convenient viewing distance from the eye. The illustrated plano-convex lens 74 on the display side of the cholesteric liquid crystal reflector 72 as part of the illumination system also may serve as part of the optics required to adjust the image viewing system. A second plano-convex lens 76 and/or other optical components generally designated 75 may be placed on the other side of the cholesteric liquid crystal reflector 72 to complete the optics in a very compact and convenient form.

In one example of the illumination system 70 the light source provides light of more than one, e.g., two, wavelength. Although the cholesteric reflector 72 may be able to reflect light of one of those wavelengths, it is not able to reflect light of the other wavelength. However, a second cholesteric liquid crystal reflector is able to reflect light of the other wavelength. Therefore, the two reflectors would be able to reflect both wavelengths produced by the light source.

The light source may produce more than two wavelengths of light, for example, red, green and blue wavelengths. In such case, three cholesteric liquid crystal reflectors may be used respectively to reflect a particular wavelength of light in the manner described above. The respective cholesteric liquid crystal reflector which reflects a particular wavelength is transparent to other wavelength.

Thus, it will be appreciated that the illumination system 70 may include a white light source 80, which includes red, green and blue lights. The several cholesteric liquid crystal reflectors are operative to reflect the various wavelengths of such white light to the liquid crystal cell 10. The display system 61 using a white light illumination system 70 is able to produce output images that are black and white. This output is distinguished from the color of the output images produced by the display systems 61 described above wherein the color of the output light is a function of the wavelength produced by the light source of the respective illumination system. The variable birefringence liquid crystal cell 10 is useful with white light sources because it can be operated to provide optical phase retardation approximately in or overlapping the zero order range. Such zero order operation helps to avoid color dispersion of light passing the liquid crystal cell which improves clarity, accuracy, resolution and overall quality of the images produced.

In a full color display the illumination system 70 includes several sources of light, each having a different wavelength. For example, three separate light sources provide red, green and blue wavelength light, respectively, or light that is in respective wavelength bands or ranges that include red, green and blue, respectively. The light sources may be respective light emitting diodes or they may be other sources of red, green and blue light or other respective wavelengths of light, as may be desired. The cholesteric liquid crystal reflectors are able to reflect red, green and blue light respectively. Such reflection occurs, as was described above, when the circular polarization characteristic of the light is the same direction as the twist direction of the cholesteric liquid crystal material in the respective reflector. The cholesteric reflectors are transparent to the other polarizations of incident light and to the other wavelengths of incident light.

The illumination system 70 sequentially illuminates the display 49 (or respective portions of the display) with respective wavelengths of light. For example, for a period of time the display (or portion thereof is illuminated with red light; subsequently illumination is by either green or blue light; and still subsequently illumination is by the other of green or blue light. Such sequential illumination may be carried out sufficiently rapidly so that respective red, green and blue images created by the display when illuminated by the respective colors of light are output from the display system and are integrated by the human eye. As a result, the human eye effectively sees a multicolor image. Other examples of frame sequential switching to provide multicolor and/or full color outputs are known in the art. Various advantages inure to a frame sequential multicolor display, including the ability to provide high resolution with approximately one-third the number of picture elements required for a full color r, g, b display system in which respective pixels are red, green or blue.

The sequential delivering of red, green and blue light to the display 49 is coordinated by the control system, such as the circuit 40, with the driving of the display 23. Therefore, when a red image or a portion of a red image is to be produced, it is done when red light is incident on the display 49; and the similar type of operation occurs with respect to green and blue images. The variable birefringence liquid crystal cell 10 is able to operate sufficiently fast to provide field sequential switching to develop respective red, green and blue (or other color) images that can be integrated by the eye to obtain a full multicolor image.

A dark condition is produced by a pixel 51a, 51b, etc., or by a substantial portion of the display 49 is produced by the display, as follows. Say right circularly polarized is directed from the light source 71 and the cholesteric reflector 72 reflects right circularly polarized light and transmits left circularly polarized light. Therefore, reflector 72 reflects light from the source 71 is reflected toward the display 49. The quarter wave plate 78 converts the light to plane polarized light. The liquid crystal cell is fully energized and ideally provides zero optical phase retardation to the light transmitted therethrough, including on the incident pass to the reflector 34 and the reflected pass from the reflector. The plane polarized light is converted by the quarter wave plate 78 to right circularly polarized light again, which is blocked by the cholesteric reflector 72 then serving as an analyzer for the display system 61. However, if the liquid crystal cell 10 is operative to provide optical phase retardation, then the wave plate 78 converts the light received from the cell to elliptically polarized light, which is comprised of two circularly polarized components, one right and the other left, which are proportional to the ellipticity of the light received from the cell. The left circularly polarized component will be transmitted by the analyzer 72 and the right circularly polarized component will be blocked.

Figure 6:
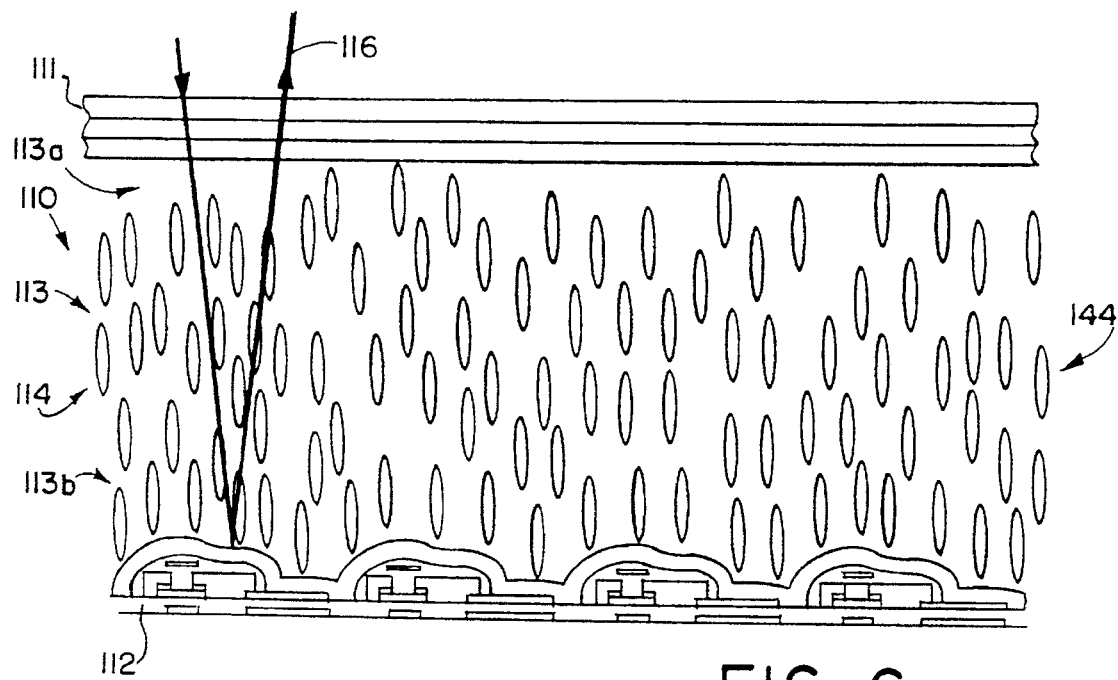
FIG. 6 is a schematic elevation view of a reflective variable birefringence liquid crystal cell using homeotropically aligned liquid crystal material that has negative dielectric anisotropy.

Turning briefly to FIG. 6 a schematic elevation view of a reflective variable birefringence liquid crystal cell 110 using homeotropically aligned liquid crystal material 113 that has negative dielectric anisotropy is shown. In FIG. 6 parts corresponding to parts described above with respect to FIGS. 1–5 are identified by corresponding reference numerals increased by the value one hundred. The liquid crystal cell 110 is a reflective variable birefringence liquid crystal cell having an active matrix substrate on at least one side. The liquid crystal cell 110 includes a pair of substrates 111, 112 and liquid crystal material 113 in the space 114 between the substrates. The liquid crystal material has negative dielectric anisotropy and is birefringent. A seal (not shown) is provided about the perimeter of the liquid crystal cell to retain the liquid crystal material therein preventing leakage.

Of the liquid crystal material 113 that liquid crystal 113a, 113b relatively proximate the substrates 111, 112 has generally homeotropic alignment. The bulk 144 of the liquid crystal material also has homeotropic alignment. During operation of the liquid crystal cell 110 optical phase retardation of light 116 (represented by a light ray line shown) traveling through the liquid crystal material can be controlled as a function of the applied electric field across the liquid crystal material. As the field is increased, at least some of the liquid crystal material 113 tends to assume homogeneous alignment, thus causing optical phase retardation of light traveling through the cell. Surface treatment, e.g., as was described above of the substrates 111, 112 may be used to cause a preferred homeotropic alignment with a small tilt angle in order to induce a preferred homogeneous alignment for controlled optical phase retardation upon application of an electric field.

The liquid crystal cell 110 ordinarily would not require any pre-alignment conditioning for the liquid crystal material. Therefore, such cell could be operated in a field on or field off condition to obtain the desired minimum or maximum optical phase retardation. If desired, however, there may be a pre-aligned conditioning of the cell 110, e.g., by electric field input, by mechanical or magnetic means, etc.

The liquid crystal cell 110 may be used in the display 49. In one operative mode, e.g., electric field on or field off, of the cell 110, for example, the cell would provide minimal optical phase retardation to obtain one light transmissive condition, e.g., transmission or blocking of light; and the other condition mode would be provided in the other operative mode.

Figure 7:
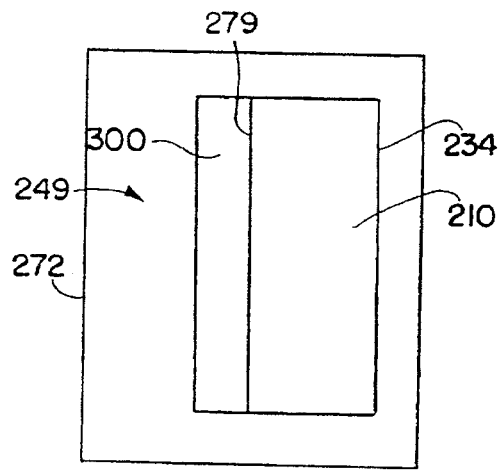
FIG. 7 is a schematic illustration of an alternate form of liquid crystal cell and display using a plane polarizer.

FIG. 7 is a schematic illustration of an alternate form of liquid crystal cell 210 and display 249 using a plane polarizer. In FIG. 7 the various parts which are the same as those used in the liquid crystal cell 10 and display 49 are labeled with the same reference numerals as in FIGS. 1 and 2, but increased by the value 200. The display 249 alternatively may the cell 110 of FIG. 6. In the display 249 there is a plane polarizer 300 at the face 279 of the cell 210. The transmission axis of the plane polarizer is aligned at an angle of 45 degrees with the primary alignment direction of the homogeneously aligned liquid crystal material 13a. The polarizer 300 may be separate from or may be adhered to the face 279 of the cell 210. If desired, the polarizer may be an evaporated coating or material, for example, on the face 279.

In the display 249 the plane polarizer 300 transmits light into the liquid crystal cell 210. If the liquid crystal cell is at the minimum retardation state of operation, the plane polarized light will transmit to the reflector 234, will be reflected back to the plane polarizer and will be further transmitted for further use in the display 249. Such further use may include conversion to circularly polarized light for analysis or selective transmission by the analyzer 272 or by some other device. Alternatively, the polarized light from the polarizer 300 may be transmitted for viewing as the output of the display 249. If the liquid crystal cell is at a condition that it provides retardation, the plane polarized light will transmit to the reflector 234, will be reflected back to the plane polarizer, but the plane of polarization will have been rotated and, therefore, the amount of light that will exit the plane polarizer 300 will be decreased.

The invention can be used with an illumination control disclosed in concurrently filed, commonly owned U.S. patent application Ser. No. 08/187,162 entitled, "Variable Intensity High Contrast Passive Display", the entire disclosure of which is incorporated by reference.

It will be appreciated that the liquid crystal cells 10, 110 and display 49 using such cells may provide optical responses for a variety of purposes, such as to develop images for viewing and/or for projection.

I claim:

1. A liquid cell, comprising a birefringent liquid crystal material in a generally hybrid aligned configuration, a pair of surfaces containing the birefringent liquid crystal material therebetween, said liquid crystal cell being configured to operate in a birefringent mode with relatively minimal color dispersion when supplied with polarized light, the birefringent liquid crystal material being preconditioned such that optical phase can be modulated to switch between two retardations to provide relatively minimal optical phase retardation and increased optical phase retardation and giving the birefringent mode minima and maxima for a given operation.

2. The liquid crystal cell of claim 1, said switching being over a range that is between such relatively minimal and increased optical phase retardation.

3. The liquid crystal cell of claim 1, said switching being between approximately zero and ¼ lambda.

4. The liquid crystal cell of claim 1, further comprising means for applying electric field to the liquid crystal cell to cause such preconditioning of the liquid crystal material.

5. The liquid crystal cell of claim 1, further comprising means for preconditioning the liquid crystal cell to provide such optical phase retardations approximately in the zero order range to substantially minimize color dispersion effects.

6. The liquid crystal cell of claim 1, further comprising means for electrically driving the liquid crystal material in the cell between alignments to provide such relatively minimal and increased optical phase retardation.

7. The liquid crystal cell of claim 6, said means for electrically driving comprising means for operating the liquid crystal cell at least approximately at zero order.

8. The liquid crystal cell of claim 7, said means for electrically driving comprising means for operating the liquid crystal cell in a range that overlaps zero order operation.

9. The liquid crystal cell of claim 1, wherein the liquid crystal material proximate one surface is in substantially homogeneous alignment and the liquid crystal material proximate the other surface is in substantially homeotropic alignment.

10. The liquid crystal cell of claim 9, wherein said one surface is substantially planar and said other surface is non-planar.

11. The liquid crystal cell of claim 10, wherein said other surface comprises a thin film transistor array.

12. The liquid crystal cell of claim 10, wherein said other surface comprises a semiconductor substrate.

13. The liquid crystal cell of claim 1, further comprising means for applying electric field to effect such preconditioning.

14. The liquid crystal cell of claim 13, further comprising means for applying electric field to effect switching between relative such minima and maxima.

15. A liquid crystal cell, comprising
a birefringent liquid crystal material configured in generally hybrid aligned configuration,
a pair of surfaces containing the birefringent liquid crystal material therebetween, said liquid crystal cell being configured to operate in a birefringent mode with relatively minimal color dispersion when supplied with polarized light,
the birefringent liquid crystal material being preconditioned in response to a field and operative to provide respective optical phase retardation conditions, thereby to switch between two retardations, one to provide relatively minimal optical phase retardation and the other to provide increased optical phase retardation, and
a plane polarizer selectively to block or to transmit light to or from one of said surfaces as a function of the direction of the plane of polarization of such light.

16. The liquid crystal cell of claim 15, further comprising means for preconditioning the liquid crystal material to switch approximately within or overlapping the zero order range.

17. A birefringent liquid crystal apparatus configured to operate in a birefringent mode with relatively minimal color dispersion effects, comprising,
at least one polarizer for polarizing incident light;
a pair of surfaces;
liquid crystal material between said surfaces in generally hybrid aligned configuration,
the liquid crystal material in relative proximity to one surface exhibiting generally homeotropic alignment,
the liquid crystal material in relative proximity to the other surface exhibiting generally homogeneous alignment,
means to alter alignment of at least one of said alignments to change the optical phase retardation characteristic exhibited by the liquid crystal material in the apparatus with substantially minimal color dispersion, and
reflector means for reflecting light transmitted in said liquid crystal material back through said liquid crystal material.

18. The apparatus of claim 17, one of said surfaces comprising a semiconductor substrate.

19. The apparatus of claim 18, said reflector means being at said semiconductor substrate.

20. The apparatus of claim 18, said one surface comprising a surface supported from a semiconductor substrate.

21. The apparatus of claim 20, said semiconductor substrate being substantially optically non-transparent.

22. The apparatus of claim 20, said one surface comprising at least part of an active matrix array.

23. The apparatus of claim 20, said substrate comprising a semiconductor substrate on which an active matrix circuit is formed.

24. The apparatus of claim 20, further comprising an active matrix array circuit at least one of in or on said semiconductor substrate.

25. The apparatus of claim 17, said means to alter comprising means to apply an electric field to the liquid crystal material to buttress such homeotropic alignment.

26. The apparatus of claim 17, said liquid crystal material comprising nematic liquid crystal.

27. A reflective liquid crystal apparatus operative in a birefringent mode with relatively minimal color dispersion effects when supplied with polarized light, comprising,
an optically reflective semiconductor substrate having electrical components,
a further substrate,
liquid crystal between said substrates in a generally hybrid aligned configuration,
electrical means cooperative with electrical components of said semiconductor substrate to apply electric field to liquid crystal material to alter the optical phase retardation characteristics of the liquid crystal,
the liquid crystal proximate said semiconductor substrate being aligned generally homeotropically, and the liquid crystal proximate said further substrate being aligned generally homogeneously,
said electrical means being operative to apply a field to buttress such homeotropic alignment of the liquid crystal relatively proximate said semiconductor substrate to precondition the apparatus to switch optical phase retardation characteristics thereby to control light, and
the further substrate being able to transmit light therethrough for transmission through the liquid crystal and reflection by said optically reflective semiconductor substrate.

28. The apparatus of claim 27, said liquid crystal comprising operationally nematic liquid crystal material.

29. The apparatus of claim 27, said liquid crystal comprising birefringent liquid crystal material.

30. The apparatus of claim 27, said electrical means being operative to switch the liquid crystal to provide optical phase retardation approximately within or overlapping the zero order range.

31. A liquid crystal apparatus configured to operate in a birefringent mode with relatively minimal color dispersion effects when supplied with polarized light, comprising a source of polarized light or a polarizer, first and second substrates, one substrate having a relatively unsmooth surface and the other having a relatively smooth surface, birefringent material between the substrates, said birefringent material comprising liquid crystal material, said liquid crystal material being in a generally hybrid aligned configuration, said liquid crystal material in relative proximity to said relatively unsmooth surface having generally homeotropic alignment, said liquid crystal material in relative proximity to said relative smooth surface having generally homogeneous alignment, and field applying means selectively to apply a field input to said liquid crystal material to precondition the liquid crystal material to provide one optical phase retardation and to provide a different optical phase retardation.

32. The apparatus of claim 31, wherein said field applying means is operable to precondition the liquid crystal material to effect substantially uniform retardation characteristic across the cell.

33. The apparatus of claim 31, said liquid crystal material comprising operationally nematic liquid crystal material.

34. A display apparatus, comprising, a source of polarized light, a liquid crystal display for selectively modulating light, said liquid crystal display comprising a semiconductor substrate and a further substrate with birefringent liquid crystal material in a generally hybrid alignment configuration between said substrates, said liquid crystal cell being configured to operate in a birefringent mode with relatively minimal color dispersion, said source being operative to provide light to pass into said liquid crystal material through said further substrate toward said semiconductor substrate, and means to reflect light to pass through said liquid crystal material and subsequently through said further substrate, the liquid crystal material being operative in response to a field input to change the optical phase retardation characteristics of the liquid crystal material.

35. The display apparatus of claim 34, said liquid crystal material having generally homeotropic alignment relatively proximate said semiconductor substrate, and generally homogeneous alignment relatively proximate said further substrate.

36. The display of claim 35, said liquid crystal material having positive dielectric anisotropy.

37. The display apparatus of claim 34, said liquid crystal material having generally homeotropic alignment relatively proximate each of said substrates, said liquid crystal material having negative dielectric anisotropy.

38. The apparatus of claim 34, said liquid crystal material comprising operationally nematic birefringent liquid crystal.

39. The apparatus of claim 34, the liquid crystal material relatively proximate said semiconductor substrate having generally homeotropic alignment and the liquid crystal material relatively proximate said further substrate having generally homogeneous alignment.

40. The apparatus of claim 39, further comprising means for applying a field to precondition the apparatus to modulate the optical phase between two retardations.

41. The apparatus of claim 40, said means for applying a field comprising means to apply a field to buttress such homeotropic alignment.

42. A birefringent liquid crystal optical apparatus, comprising, a liquid crystal cell including a pair of substrates and a birefringent liquid crystal material in a generally hybrid alignment configuration between the substrates, said liquid crystal cell being configured to operate in a birefringent mode with relatively minimal color dispersion when supplied with polarized light, means for applying electric field between said substrates to alter liquid crystal alignment and therefore optical phase retardation characteristics of liquid subject to such field, one of said substrates including means for causing generally homeotropic alignment of liquid crystal material that is relatively proximate to said substrate, said means for applying electric field comprising means to buttress such homeotropic alignment to precondition the liquid crystal material for altering optical phase retardation characteristics.

43. The apparatus of claim 42, the liquid crystal material relatively proximate the other of said substrates having generally homogeneous alignment.

44. The apparatus of claim 43, said means for applying comprising means to apply electric field to said liquid crystal material primarily to align liquid crystal material in the area between said homeotropically aligned liquid crystal material and the other of said substrates in a direction generally parallel with said homeotropically aligned liquid crystal thereby to alter the optical phase retardation characteristics of the liquid crystal material.

45. The apparatus of claim 44, said liquid crystal material having approximately ¼ wave optical phase retardation characteristics in one operative condition thereof in response to application of a relatively low voltage electric field by the means for applying, and approximately zero wave optical phase retardation characteristics in a different operative condition thereof in response to application of a relatively larger voltage electric field by the means for applying.

46. The apparatus of claim 16, said liquid crystal material comprising operationally nematic liquid crystal material.

47. A method of variably phase retarding light by a liquid crystal cell operable in a birefringence mode when supplied with polarized light and in which birefringent operationally nematic liquid crystal material is configured in a generally hybrid alignment configuration to be in substantially homeotropic alignment with one surface and substantially homogeneous alignment with another surface of the liquid crystal cell, comprising applying a field to precondition the orientation of liquid crystal material in the liquid crystal cell to buttress such substantially substantially homeotropic alignment, and applying an input to the cell to change the orientation of at least some of the liquid crystal material thereby to alter the optical phase retardation of light transmitted in the liquid crystal material without substantial color dispersion.

48. The method of claim 47, said preconditioning comprising applying an input to the cell tending to buttress the substantially homeotropic alignment for substantially uniform optical phase retardation through the liquid crystal cell at the area where the input is applied.

49. The method of claim 48, said applying an input comprising changing a characteristic of an applied field to the liquid crystal material to change the optical phase retardation characteristic of the liquid crystal material between the preconditioned to a different optical phase retardation.

50. The method of claim 47, said applying comprising applying electric field to said liquid crystal material primarily to align liquid crystal material in the area between the homeotropically aligned liquid crystal material and the other of said substrates in a direction generally parallel with the homeotropically aligned liquid crystal thereby to alter the optical phase retardation characteristics of the liquid crystal material.

51. A birefringent liquid crystal apparatus configured to operate in a birefringent mode, comprising, a liquid crystal cell including a pair of surfaces and liquid crystal material between said surfaces in generally hybrid, generally untwisted aligned configuration, means to alter alignment of at least one of said alignments to change the optical phase retardation characteristic exhibited by the liquid crystal material in the apparatus, and reflector means for reflecting light transmitted in said liquid crystal material back through said liquid crystal material, the birefringent liquid crystal material being preconditioned such that optical phase can be modulated to switch between two retardations to provide relatively minimal optical phase retardation and increased optical phase retardation and giving the birefringent mode minima and maxima for a given operation, said switching being between approximately zero and ¼ lambda.

52. A birefringent liquid crystal apparatus configured to operate in a birefringent mode, comprising, a liquid crystal cell including a pair of surfaces and liquid crystal material between said surfaces in generally hybrid, generally untwisted aligned configuration, means for applying electric field to alter alignment of at least one of said alignments to change the optical phase retardation characteristic exhibited by the liquid crystal material in the apparatus, and reflector means for reflecting light transmitted in said liquid crystal material back through said liquid crystal material, said liquid crystal material having approximately ¼ wave optical phase retardation characteristics in one operative condition thereof in response to application of a relatively low voltage electric field by the means for applying, and approximately zero wave optical phase retardation characteristics in a different operative condition thereof in response to application of a relatively larger voltage electric field by the means for applying.

53. A reflective liquid crystal apparatus operative in a birefringent mode when supplied with polarized light, comprising, an optically reflective semiconductor substrate having electrical components, a further substrate, liquid crystal between said substrates in a generally untwisted hybrid aligned configuration, electrical means cooperative with electrical components of said semiconductor substrate to apply electric field to liquid crystal material to alter the optical phase retardation characteristics of the liquid crystal, the liquid crystal proximate said semiconductor substrate being aligned generally homeotropically, and the liquid crystal proximate said further substrate being aligned generally homogeneously, said electrical means being operative to apply a field to buttress such homeotropic alignment of the liquid crystal relatively proximate said semiconductor substrate to precondition the apparatus to switch optical phase retardation characteristics thereby to control light, said liquid crystal material being operable in response to characteristics of the field to switch between two optical phase retardation effects by approximately ¼ lambda, and the further substrate being able to transmit light therethrough for transmission through the liquid crystal and reflection by said optically reflective semiconductor substrate.

* * * * *